(12) United States Patent
Hale

(10) Patent No.: US 12,551,252 B2
(45) Date of Patent: Feb. 17, 2026

(54) APPARATUS AND METHOD OF AN OSTEOTOMY FOR DENTAL IMPLANT

(71) Applicant: INDIVIDUAL IMPLANT SOLUTIONS, INC., Woodland Hills, CA (US)

(72) Inventor: Robert G. Hale, Woodland Hills, CA (US)

(73) Assignee: INDIVIDUAL IMPLANT SOLUTIONS, INC., Woodland Hills, CA (US)

( * ) Notice: Subject to any disclaimer, the term of this patent is extended or adjusted under 35 U.S.C. 154(b) by 497 days.

(21) Appl. No.: 18/296,046

(22) Filed: Apr. 5, 2023

(65) Prior Publication Data
US 2023/0233240 A1 Jul. 27, 2023

Related U.S. Application Data

(62) Division of application No. 17/553,085, filed on Dec. 16, 2021.

(60) Provisional application No. 63/126,428, filed on Dec. 16, 2020.

(51) Int. Cl.
| | | |
|---|---|---|
| *A61B 17/80* | (2006.01) | |
| *A61C 1/08* | (2006.01) | |
| *A61C 8/00* | (2006.01) | |
| *A61C 8/02* | (2006.01) | |
| *A61C 13/00* | (2006.01) | |
| *A61F 2/28* | (2006.01) | |

(52) U.S. Cl.
CPC ........ *A61B 17/8071* (2013.01); *A61C 8/0019* (2013.01); *A61C 8/0031* (2013.01); *A61C 8/0089* (2013.01); *A61F 2/2803* (2013.01); *A61C 1/084* (2013.01); *A61C 8/0006* (2013.01); *A61C 13/0004* (2013.01)

(58) Field of Classification Search
None
See application file for complete search history.

(56) References Cited

U.S. PATENT DOCUMENTS

| | | | | |
|---|---|---|---|---|
| 5,803,735 | A * | 9/1998 | Gittleman | A61C 3/16 433/172 |
| 9,737,068 | B1 | 8/2017 | Lytle, Jr. | |
| 2010/0304334 | A1 * | 12/2010 | Layton | A61C 8/005 433/201.1 |

* cited by examiner

Primary Examiner — Sean Shechtman
(74) Attorney, Agent, or Firm — Oblon, McClelland, Maier & Neustadt, L.L.P.

(57) ABSTRACT

The present disclosure relates to a method of manufacture of a dental implant for a molar, including acquiring, structural data corresponding to bones of the facial skeleton, the bones of the facial skeleton being proximate the molar, selecting, as a dental implant fixation surface, a surface of the bones based upon a determined thickness of the bones, generating, based on the selected dental implant fixation surface, a contoured surface of the dental implant, and fabricating, based upon an instruction transmitted by processing circuitry, a bone plate extending from a buccal end of a cylindrical plate of the dental implant, the cylindrical plate having support lattices extending therefrom, at least one support lattice of the support lattices being arranged on a lingual end of the cylindrical plate, the cylindrical plate having an opening in a central region thereof, the opening being configured to receive a dental post.

13 Claims, 23 Drawing Sheets

An internal alveolar osteotomy is guided by a template. — S702

A LM-TDI is secured to alveolar cortices. — S704

The dental post is secured to the LM-TDI plate. — S706

Bone graft alveolus around the LM-TDI plate and the dental post is performed. — S708

An analog crown covers the bone graft. — S710

Gingivae is supported by the analog crown. — S712

FIG. 7D

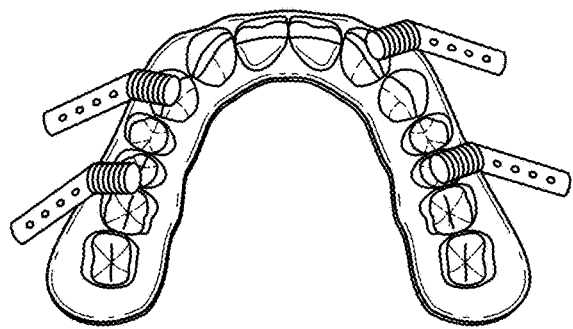
FIG. 12L-2
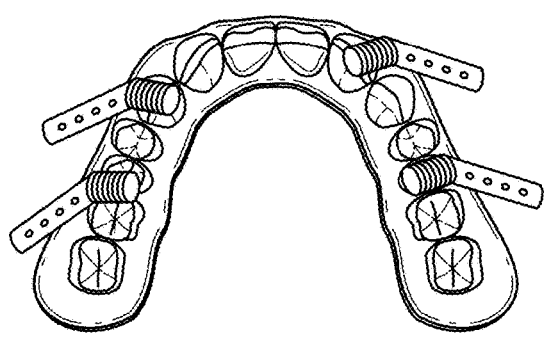
FIG. 12M-2
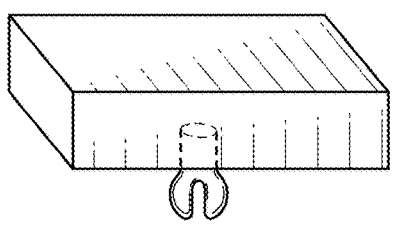
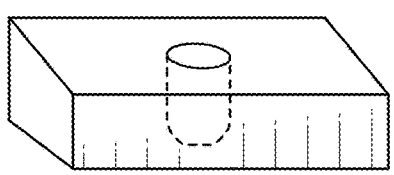
FIG. 12N-1
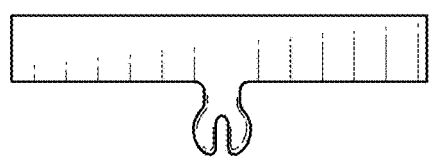
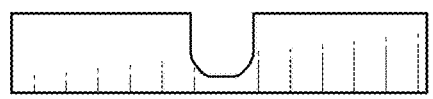
FIG. 12N-2

APPARATUS AND METHOD OF AN OSTEOTOMY FOR DENTAL IMPLANT

CROSS-REFERENCE TO RELATED APPLICATIONS

This application is a divisional of U.S. patent application Ser. No. 17/553,085, filed on Dec. 16, 2021, which is based upon and claims the benefit of U.S. Provisional Application No. 63/126,428, filed on Dec. 16, 2020, the entire contents of each of which are incorporated by reference herein in its entirety for all purposes.

BACKGROUND

Field of the Disclosure

The present disclosure relates to an apparatus and a method of an osteotomy for dental implant.

Description of the Related Art

Conventional dental implant technologies benefit from a lack of competition posed by from alternative technologies. However, the market of dental implants has been waning under pressure from value brand dental implants sold online because conventional dental implants have a similar reasonable level of success but they also have the same limited capabilities, e.g., need for adequate alveolar bone even the lowest level of success.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

Aspects of the invention may address some of the above-described shortcomings in the art, particularly using solutions set forth in the claims.

SUMMARY

The present disclosure relates to apparatus and method for a vertical osteotomy for dental implant.

The present disclosure includes a method of manufacture of a dental implant for a molar, including acquiring, by processing circuitry, structural data corresponding to one or more bones of the facial skeleton, the one or more bones of the facial skeleton being proximate the molar; selecting, by the processing circuitry and as a dental implant fixation surface, a surface of the one or more bones of the facial skeleton based upon a determined thickness of the one or more bones of the facial skeleton; generating, by the processing circuitry and based on the selected dental implant fixation surface, a contoured surface of the dental implant; and fabricating, based upon an instruction transmitted by the processing circuitry, a bone plate extending from a buccal end of a cylindrical plate of the dental implant, the cylindrical plate having support lattices extending therefrom, at least one support lattice of the support lattices being arranged on a lingual end of the cylindrical plate, the cylindrical plate having an opening in a central region thereof, the opening being configured to receive a dental post.

The present disclosure includes a dental implant for a molar, including a dental post; a cylindrical plate having an opening in a central region thereof, the opening being configured to receive the dental post; a bone plate extending from a buccal end of the cylindrical plate, the bone plate having a surface for contact with one or more bones of the facial skeleton, the surface being contoured relative to a surface of the one or more bones of the facial skeleton and based on a thickness of the one or more bones of the facial skeleton; and support lattices coupled to the cylindrical plate, the support lattices extending from a lingual end the cylindrical plate, the support lattices including an aperture for fixation.

The foregoing paragraphs have been provided by way of general introduction, and are not intended to limit the scope of the following claims. The described features, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7D is a flow diagram of a process of an analog crown over graft, within the scope of the present disclosure;

FIG. 12D-2 to 12M-2 is the occlusal view of the same templates and sequence of steps, within the scope of the present disclosure.

FIG. 12N-1 and FIG. 12N-2 show views of the fasteners used to interchange the templates, within the scope of the present disclosure.

DETAILED DESCRIPTION

Figure 1A:
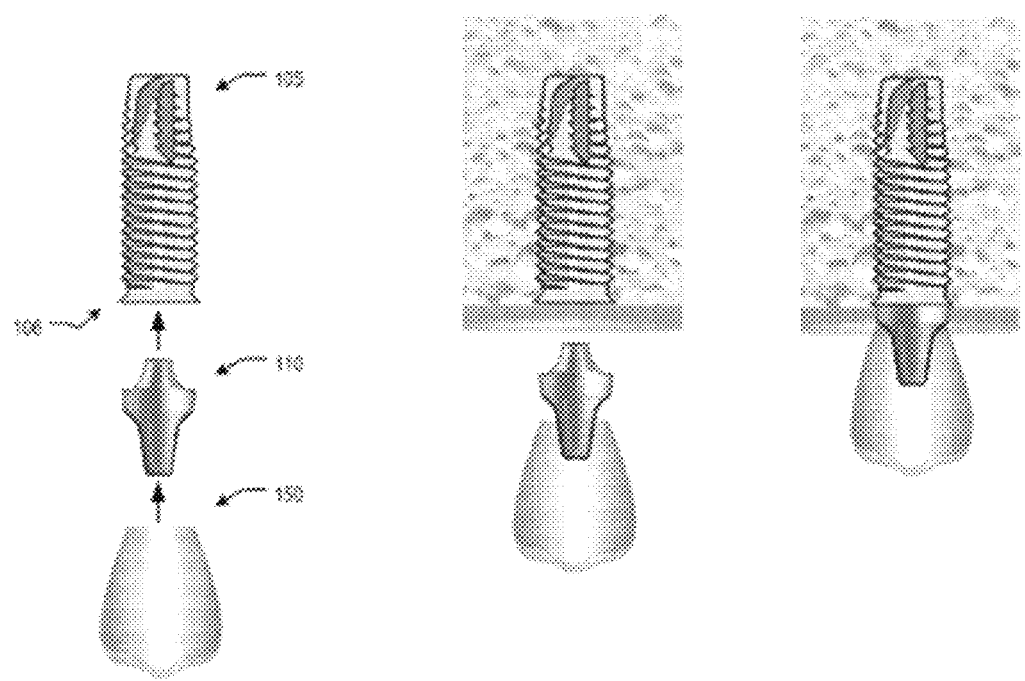
FIG. 1A is a schematic of a dental implant system, within the scope of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (e.g., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Unless indicated otherwise, the features and embodiments described herein are operable together in any permutation.

The terms "about" and "approximately" are defined as being close to as understood by one of ordinary skill in the art.

The process of the present disclosure can "comprise," "consist essentially of," or "consist of" particular ingredients, components, compositions, etc., disclosed throughout the specification.

The present disclosure describes transalveolar dental implant (TDI) directed to upper molars and lower molars of a patient's dentition. Such upper molar TDI (UM-TDI) and lower molar (LM-TDI) provide a patient-specific, custom manufactured, and uniquely applied dental implant system. Such as a system is not merely an improvement or an addition to the current dental implant parts bin. LM-TDI and UM-TDI use advanced digital systems to image, analyze, design and 3D print custom titanium dental implant devices, acrylic surgical templates, and acrylic temporary prostheses to provide predictable, one stage surgery for the immediate restoration of form and function of removed teeth.

The present disclosure, LM-TDI and UM-TDI, may allow surgeons to remove a tooth, multiple teeth, or an entire dental arch and replace the dentition on root form implants embedded accurately within the residual alveolus and secured to adjacent cortical bone by attached custom contoured bone plates and screws for immediate restoration of dental anatomy and function.

Conventional dental implants have been unable to address many important clinical situations as interest in dental implants shifts from dentures, which traditionally have dominated the dental implant market, to restoration of individual teeth for patients who otherwise have healthy dentition.

The LM-TDI and the UM-TDI of the present disclosure provide numerous advantages, including immediate implant reconstruction after removal of dentition versus staged procedures, immediate fixed prosthetic function versus treatment phases of removable temporaries, highly accurate dental post and crown/prosthesis placement versus time-consuming chairside craftsmanship, and preservation of the alveolar contours and investing soft tissue gingivae versus incomplete dental anatomy restoration.

In an embodiment, preserving the alveolus and gingivae is critical, particularly as it relates to anterior teeth, to maintain the smile aesthetics of gingival papillae filling dental embrasures. Preservation of gingivae is also important for posterior teeth to prevent food, debris, and plaque from accumulating in the embrasures. Only through immediate implant reconstruction with fixed dental crown analogs to support the alveolus and gingivae after surgery is treatment predictable to ensure complete dental anatomy restoration.

Beyond replacement of failed dentition, there is a significant medical market to address the needs of patients with congenital anodontia, a patient population which includes ectodermal dysplasia, alveolar clefts, and other syndromes.

These patients are treated in major medical centers by, for example, cleft palate teams, and their care is generously supported by government funding and private foundations. The coincidence of these conditions, and thus the market thereof, is in the range of 100,000 patients per year in the U.S. and much more when congenital agenesis of maxillary lateral incisors is considered. These patients are a special challenge because agenesis of a tooth is also agenesis of alveolar bone.

With reference now to the Figures, and as background to the present disclosure, root-form dental implants are an effective strategy for dental reconstruction when sufficient alveolar bone is present. Compared with tooth-supported dental bridges, root-form dental implants, fixed within the alveolar bone, are able to maintain the health of the underlying bone by preserving bone loading. FIG. 1A, for instance, shows a root-form dental implant comprised, initially, of a post 105, or screw-like metal component, fixed within the alveolar bone of the facial skeleton. An abutment 110, which serves as a platform for a crown 150 to be added later, is mechanically coupled to a base of the post 106.

Figure 1B:
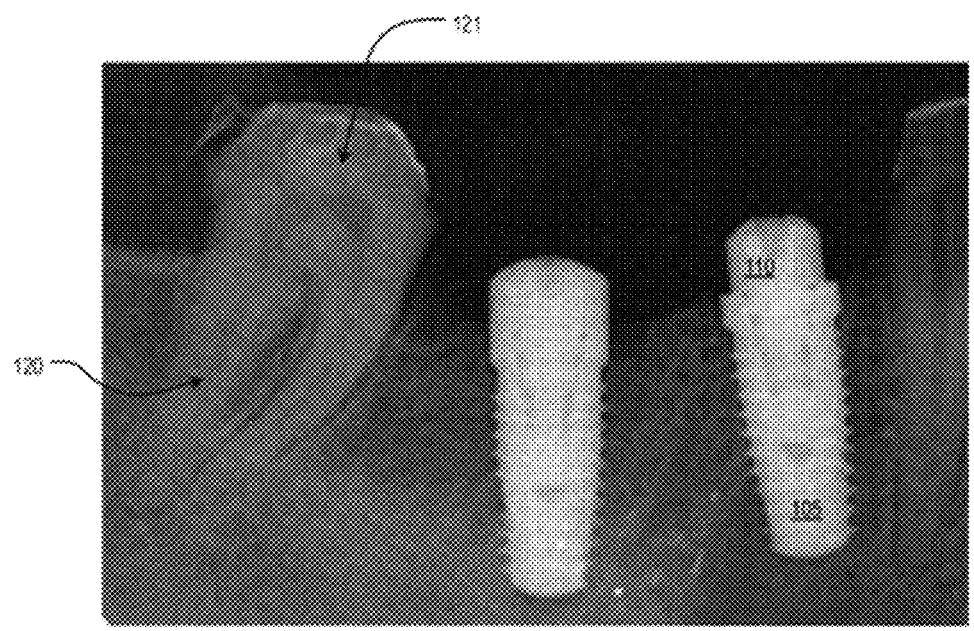
FIG. 1B is a radiograph of a dental implant system in vivo, within the scope of the present disclosure.

In a radiograph, as seen in FIG. 1B, the post 105 is rigidly fixed within the alveolar bone, similar to the arrangement of a root 120 of a native tooth 121. In the majority of cases, patients go home with a functional replacement, receive a permanent crown set when the implant is integrated (8-12 weeks), and are able to return to normal function with improved mastication, speech, and aesthetics.

In cases of inadequate bone, however, as a result of bone atrophy or skeletal pre-disposition, root-form dental implants, as described above, are not a surgical option. In such cases, it may be necessary to resort to special techniques including but not limited to bone grafts directed to bone atrophy, alveolar bone distraction osteogenesis, lifting of the maxillary sinus with bone filling, lateralization of the mandibular bone nerve, corticotomy, and alveolar expansion, with or without graft. While the above approaches offer hope to certain patients, each carries with it a respective set of drawbacks. Generally, these techniques increase chair time and the number of associated laboratory steps required to fit a dental prosthesis. Specifically, as in the case of bone grafting, risks of donor site morbidity and a time-intensive recovery period prior to implantation of dental implant hardware present significant challenges to successful outcomes.

The present disclosure addresses the above-described drawbacks of conventional approaches as they relate to the full range of dentition.

With reference now to FIG. 2A through FIG. 2F, different views of an exemplary custom 3D printed upper first molar TDI (UM-TDI) for immediate restoration of anatomy and function after extraction are shown, within the scope of the present disclosure. In an embodiment, and as it relates to a particular structure of the UM-TDI, FIG. 2A through FIG. 2F may share similar structural, material, and design characteristics with FIG. 7A and FIG. 7B, which will be described later in greater details.

Figure 2A:
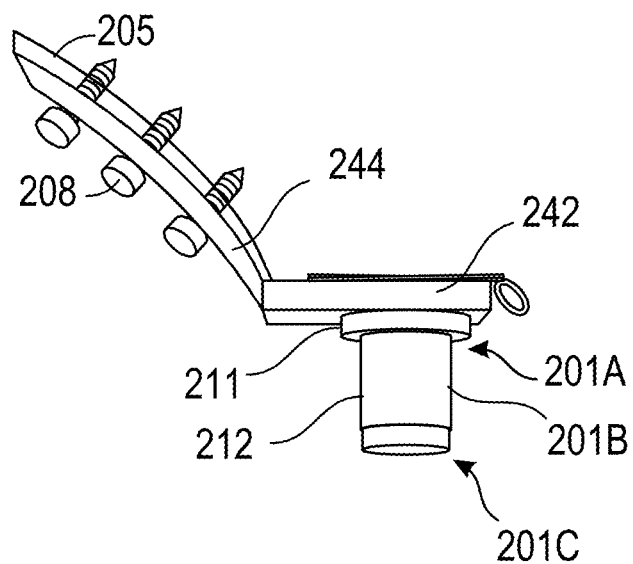
FIG. 2A provides a view of an exemplary custom 3D printed upper molar (UM) transalveolar dental implant for immediate restoration of anatomy and function after extraction, within the scope of the present disclosure.

FIG. 2A shows individual structures of the dental implant including a bone plate 205, a cylindrical plate 211, a dental post 212, and mini screws 208, 210. The mini screws 208, 210 may be used to fix the support lattices to the facial skeleton through an aperture 705, which will be described later with respect to FIG. 7A and FIG. 7B.

In an embodiment, the dental post 212 may include a post base 201A, a post body 201B, and a post abutment platform 201C. The dental post 212 which will be described in greater detail with reference to the dental post of FIG. 7A. The post body 201B may be the body portion of the dental post 212. The post base 201A may be coupled to an aspect of the bone plate 205. The dental post 212 may be configured to receive an abutment by features on the post abutment platform 201C.

In an embodiment, the dental post 212 can be a non-metallic material such as zirconia, ceramic, fiber-reinforced resins, and carbon fiber, fiberglass, or a metallic material such as titanium, stainless steel, titanium alloy, and gold alloy. Other materials, as appropriate, may also be used.

In an embodiment, the bone plate 205 may comprise two portions, which will be described in further detail with reference to FIG. 3. A first portion 242 may be a planar portion 242. A second portion 244 may be a contoured portion 244. The contoured portion 244 may be contoured with respect to a selected region of the facial skeleton determined to be of sufficient bone quality for fixation.

In an embodiment, the bone plate 205 may be fabricated via direct metal laser sintering. In an embodiment, the bone plate 205 can be a non-metallic material such as zirconia, ceramic, fiber-reinforced resins, and carbon fiber, fiberglass, or a metallic material such as titanium, stainless steel, titanium alloy, and gold alloy. Other materials, as appropriate, may also be used.

In an embodiment, a thickness of the planar portion 242 of the bone plate 205 may be between 1 mm and 2 mm and a length of the planar portion 242 of the bone plate 205 may be between 6 mm and 10 mm. In an example, the thickness of the planar portion 242 of the bone plate 205 may be 1.5 mm and a length of the planar portion 242 of the bone plate 205 may be 8 mm.

In an embodiment, and as described later in FIG. 3, a plurality of through apertures 318 having locking threads and sized in accordance with appropriate screws may be disposed along the length of the contoured portion 244 of the bone plate 205, passing from an anterior surface to a posterior surface. The appropriate screws may be the mini screws 208 of FIG. 2A through FIG. 2D.

In an embodiment, the quality of bone required for fixation of the contoured portion 244 of the bone plate 205 is related, in part, to the selected screws 208, 210 for fixation and relative to a pre-determined minimum cortical bone thickness. In an example, the pre-determined minimum facial bone thickness is 1.5 mm. In another example, the pre-determined minimum facial bone thickness is based upon properties of the selected screw, including but not limited to diameter, pitch, and screw length.

According to an embodiment, a width of the bone plate 205 can be equal to the diameter of the dental post 212. The thickness of the bone plate 205 is determined according to the length of the bone plate 205, wherein a longer bone plate 205 requires an increase in thickness of the bone plate 205 to support the dental post 212 and prevent excess micro-motion. In an example, the thickness of the bone plate 205 ranges between 1.00 mm and 3.00 mm, and preferably between 1.25 mm and 2.00 mm. The length of the bone plate 205, therefore, is determined according to locally sufficient cortical bone.

In an embodiment, the cylindrical plate 211 may be, but is not limited to, a plate with a cylindrical shape or a pillar with an opening in the center portion, which will be described in more detail with reference to FIG. 7A. The dental post 212 may be rotationally coupled to the opening in the cylindrical plate 211. The opening of the cylindrical plate may be threaded. The diameter of the opening of cylindrical plate 211 may be between 3 mm and 5 mm. The diameter of the opening may be compatible with the diameter of the post apex (not shown in FIG. 2A through FIG. 2F) of the dental post 212.

In an embodiment, the cylindrical plate 211 can be a non-metallic material such as zirconia, ceramic, fiber-reinforced resins, and carbon fiber, fiberglass, or a metallic material such as titanium, stainless steel, titanium alloy, and gold alloy. Other materials, as appropriate, may also be used. The outer diameter of the cylindrical plate 211 may be between 4 mm and 6 mm.

In an embodiment, the mini screws 208, 210 may be used to fix the bone plate 205 to the facial skeleton. The mini screws 208, 210 can be, but is not limited to, a metallic material such as titanium, stainless steel, titanium alloy, and gold alloy. Other materials, as appropriate, may also be used. The length of the mini screws 208, 201 may be dependent on the thickness of the cortical bone. For example, the length of mini screws 208, 210 may be between 5 mm and 6 mm if the thickness of the cortical bone is 2 mm.

Figure 2B:
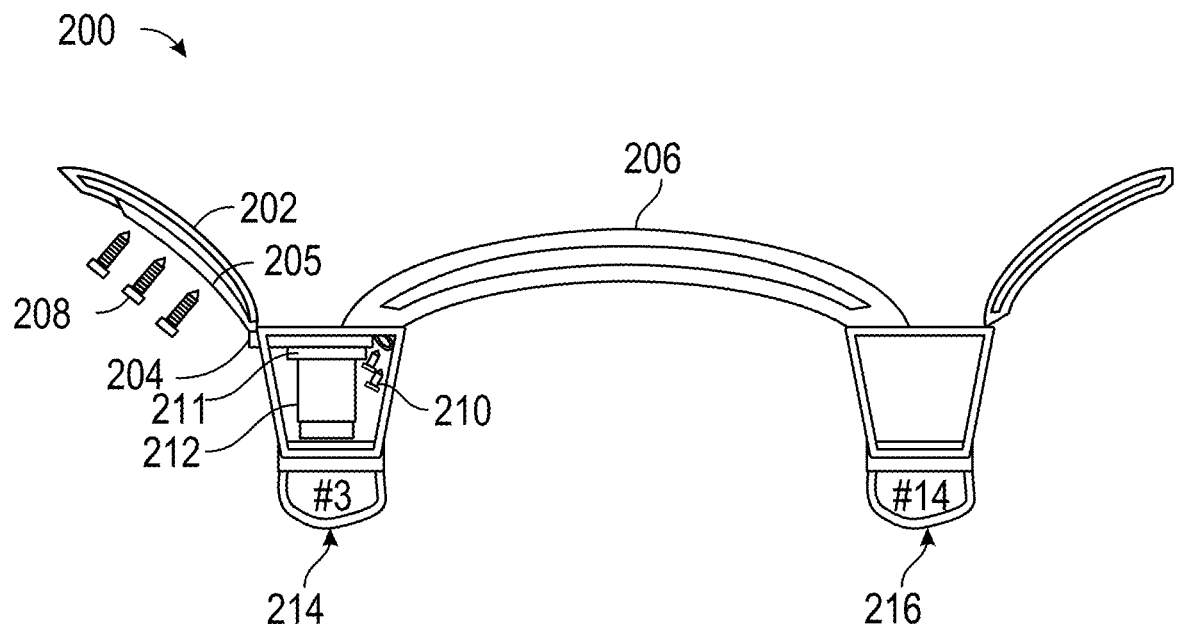
FIG. 2B provides a view of an exemplary custom 3D printed UM transalveolar dental implant for immediate restoration of anatomy and function after extraction, within the scope of the present disclosure.
Figure 2C:
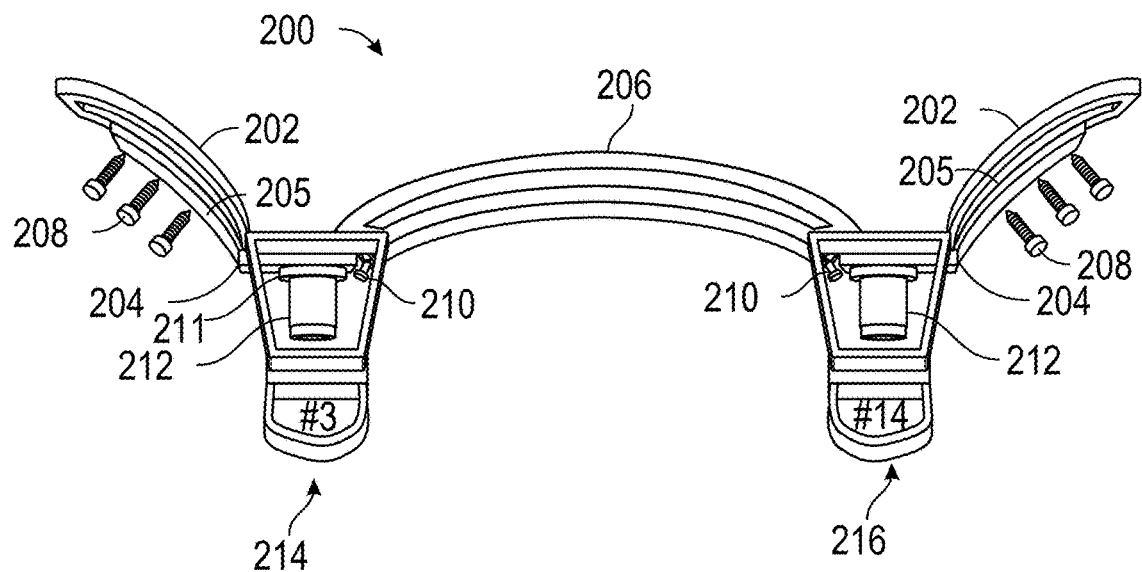
FIG. 2C provides a view of an exemplary custom 3D printed UM transalveolar dental implant for immediate restoration of anatomy and function after extraction, within the scope of the present disclosure.
Figure 2D:
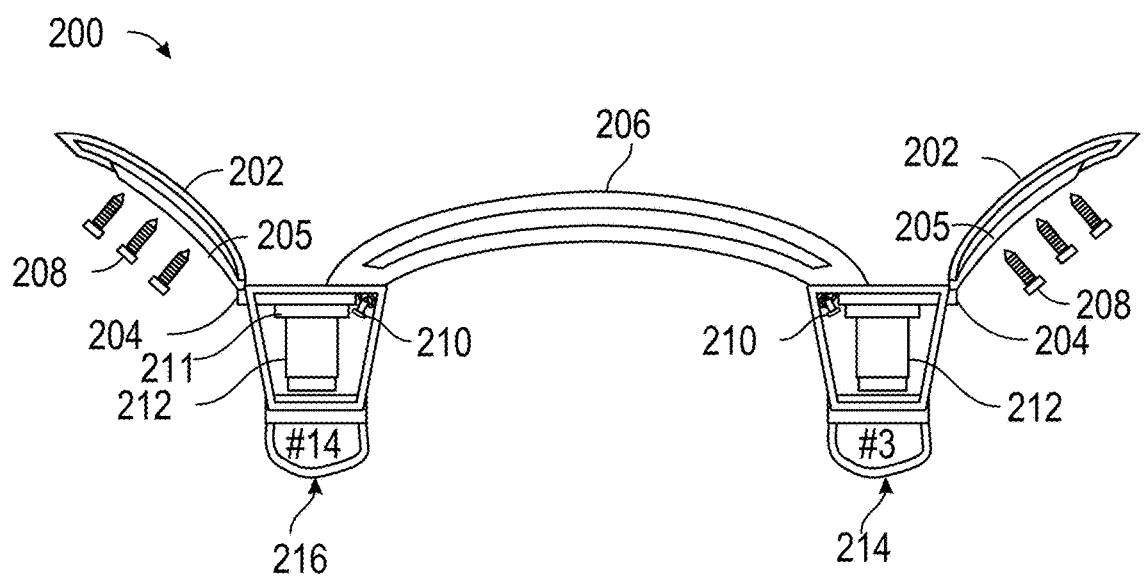
FIG. 2D provides a view of an exemplary custom 3D printed UM transalveolar dental implant for immediate restoration of anatomy and function after extraction, within the scope of the present disclosure.

FIG. 2B is an illustration of a front view of the UM-TDI plate secured to the zygoma and alveolar cortices with mini screws on tooth 214 (#3). FIG. 2C and FIG. 2D are an illustration of a bilateral implementation of the UM-TDI of the present disclosure. FIG. 2C illustrates a front view of the bilateral UM-TDI and FIG. 2D illustrates a rear view of the bi-lateral UM-TDI, wherein respective bone plates may be secured to the zygoma and alveolar cortices by mini screws on tooth 214 (#3) and tooth 216 (#14).

In an embodiment, the UM-TDI device 200 has a contoured bone plate 205 configured to be in contact with zygomatic bone 202 of the facial skeleton, the bone plate 205 being designed in order to pass through a small buccal osteotomy (e.g., pass-through osteotomy 204) and extend superiorly to the thick cortex of the zygomatic buttress. Fixing the bone plate 205 to the zygomatic bone 202 is essential when, as is particular to the upper molar, buccal roots of the tooth reduce the volume of cortical bone that can be used for fixation. On the palatal side, e.g., palate 206, of the alveolus, two small plate extensions of the UM-TDI device 200 are configured to rest on prepared inner aspects of the alveolar cortex. Once the UM-TDI device 200 is engaged with the zygomatic buttress of the zygoma bone 202 and the inner alveolar palatal cortex (e.g., palate 206), the UM-TDI 200 can be secured by mini screws 208, 210. A dental post 212 can then be secured to the base of the device via frictional coupling (e.g., locking screw technology). In an embodiment, the dental post 212 can be a non-metallic material such as zirconia, ceramic, fiber-reinforced resins, and carbon fiber, fiberglass, or a metallic material such as titanium, stainless steel, titanium alloy, and gold alloy. Other materials, as appropriate, may also be used. The alveolus with the embedded UM-TDI device 200 is then bone grafted and a naturally contoured crown analog is secured to the dental post 212 to cover the graft and support the investing gingival contours for complete restoration of the dental anatomy and function. The dental posts may be connected to tooth 214 (#3) and 216 (#14).

In an embodiment, the bone plate 205 extends from a buccal end of the cylindrical plate 211. The bone plate 205 may have a surface for contact with bones of the facial skeleton such as the zygoma bone 202. The surface of the bone plate 205 may be contoured relative to a surface of the bones of the facial skeleton such as the zygoma bone 202 and may be based on a thickness of the bones of the facial skeleton.

In some embodiments, the UM-TDI device 200 may be used for both upper molars.

Figure 2E:
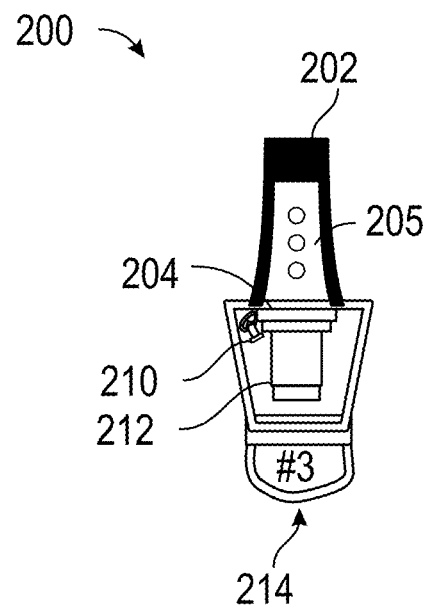
FIG. 2E provides a view of an exemplary custom 3D printed UM transalveolar dental implant for immediate restoration of anatomy and function after extraction, within the scope of the present disclosure.
Figure 2F:
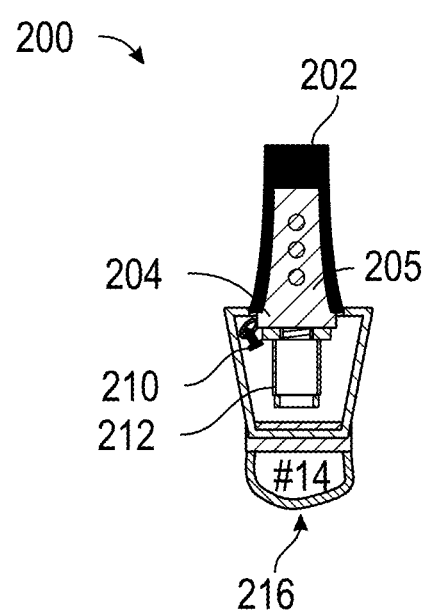
FIG. 2F provides a view of an exemplary custom 3D printed UM transalveolar dental implant for immediate restoration of anatomy and function after extraction, within the scope of the present disclosure.

FIG. 2E and FIG. 2F show side views of the UM-TDI plates on tooth 214 (#3) and tooth 216 (#14). As described earlier, the side views of the UM-TDI plates may show the bone plate 205, the dental post 212, mini screws 208, 210, and zygoma bone 202.

In an embodiment, the mini screws 208 may be in the center portion of the bone plate 205. As mentioned earlier, the mini screws 208, 210 may be used to fix the support lattices to the facial skeleton through an aperture 705, which will be described later with respect to FIG. 7A and FIG. 7B. The number of the apertures 705 may be dependent on the selected skeletal region and the minimum number of screws required in order to secure the bone plate 205 to the facial skeleton.

In an embodiment, the length of the UM-TDI plates may be between 16 mm and 30 mm. The length of the UM-TDI may be dependent on the thickness of the cortical bone. For example, the length of the UM-TDI plates may be 20 mm if the thickness of the cortical bone is 2.5 mm.

In another embodiment, as alluded to above, a length of the dental post 212 may be between 6 mm and 10 mm. In an example, the length of the dental post 212 may be 8 mm.

The UM-TDI of FIG. 2A through FIG. 2F may be based on a transalveolar dental implant (TDI), as described in FIG. 3 through FIG. 6. For instance, the bone plate 205 of the UM-TDI of FIG. 2A through FIG. 2F may be similar to the bone plate of the TDI of FIG. 3 through FIG. 6.

In an embodiment, the TDI includes a contoured bone plate extending transalveolarly through an alveolar bone vertical slot osteotomy to an adjacent bone of the facial skeleton, thus providing primary stability to the TDI. The alveolar bone vertical slot osteotomy, with newly resident post, is filled via bone grafting to ensure bone regeneration and stabilization of the post. In an example, where four TDIs are implanted around the dental arch, a full dental arch prosthesis may be coupled to the TDIs for immediate function.

Figure 3:
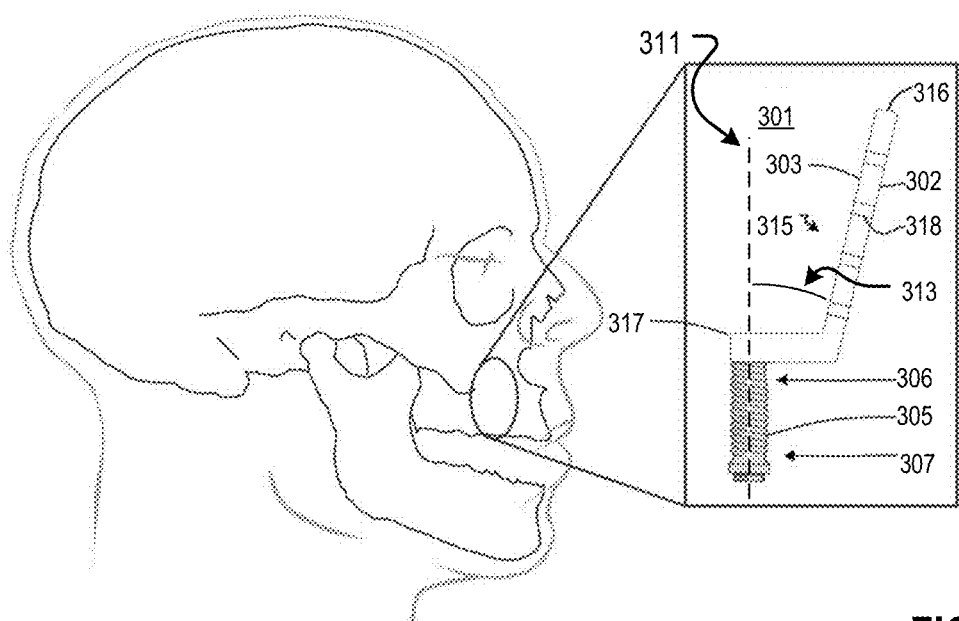
FIG. 3 is a cross-sectional schematic of a transalveolar dental implant, within the scope of the present disclosure.

FIG. 3 describes an exemplary embodiment of a TDI, which may be implemented in the present disclosure as a component of the UM-TDI and/or a LM-TDI, which will be described later.

In an embodiment, the TDI 301 is directed to a region of the facial skeleton known as the alveolar bone, a thickened bony region that supports the dental root system. The TDI 301 of the present disclosure includes a post 305. The post 305 includes a post base 307 and a post apex 306. The post base 307 may be designed to receive an abutment. The post apex 306, instead of being coupled to trabeculae of the alveolar apex, may be coupled to an aspect of the bone plate 315. The bone plate 315 may comprise two portions. The first portion may be a planar portion 317 meant for coupling with the post apex 306 and for physical interaction with a captive surface of an osteotomy, the captive surface being, in an upper arch embodiment of the present disclosure, a superior portion of the osteotomy. The second portion may be a contoured portion 316. The contoured portion 316 may be contoured with respect to a selected region of the facial skeleton determined to be of sufficient bone quality for fixation.

In an embodiment, an axis of the contoured portion 316 may be related to a longitudinal axis 311 of the bone plate 315 by an anterior angle 313. A plurality of through apertures 318 having locking threads and sized in accordance with appropriate screws are disposed along the length of the contoured portion 316 of the bone plate 315, passing from an anterior surface 302 to a posterior surface 303, for fixation of the TDI 301, via the posterior surface 303, to the facial skeleton.

In another embodiment, the plurality of through apertures 318, lacking threads and sized in accordance with appropriate screws, may be disposed along the length of the contoured portion 316 of the bone plate 315, passing from the anterior surface 302 to the posterior surface 303, for fixation of the TDI 301, via the poster surface 303, to the facial skeleton.

The quality of bone required for fixation of the contoured portion 316 of the bone plate 315 is related, in part, to the selected screws for fixation and relative to a pre-determined minimum cortical bone thickness. In an example, the pre-determined minimum cortical bone thickness is 1.5 mm. In another example, the pre-determined minimum cortical bone thickness is based upon properties of the selected screw, including but not limited to diameter, pitch, and screw length.

As briefly described, the contoured portion 316 of the TDI 301 is designed in the context of an individual patient's skeletal structure. Following the acquisition and reconstruction of medical images, via a data processing device having a processing circuitry, reflecting the macro- and microstructure of the bone of the facial skeleton, via techniques including but not limited micro-computed tomography, cone beam computed tomography, and high-resolution magnetic resolution imaging, one or more regions of the facial skeleton are selected as receptive to fixation of a bone plate. According to an embodiment, and as mentioned above, this determination is made based upon local cortical bone thickness, wherein sufficient cortical bone, the dense outer surface of bone, is required to prevent fracture during bone plate fixation. Following region selection, a reconstructed model of the one or more regions of interest is then further manipulated via software (e.g. Mimics, SolidWorks) and prepared for manufacturing, as would be understood by one of ordinary skill in the art.

According to an embodiment, the posterior surface 303 of the bone plate 315 is contoured relative to the selected facial skeleton region and the anterior surface 302 of the bone plate 315 is substantially planar. It should be appreciated that the anterior surface 302 of the bone plate 315 may be of a variety of contours, in a nonlimiting manner, such that rigid fixation, via screws through the plurality of through apertures 318, may be realized.

Each bone plate 315 is manufactured in order to allow rigid fixation to the facial skeleton of the patient and to promote osseointegration between the TDI 301 and the periprosthetic bone. To this end, and according to an embodiment, the TDI 301 of the present disclosure can be manufactured from one of a group of materials including but not limited to titanium, cobalt-chrome, cobalt-chrome-molybdenum, cobalt-chrome-nickel, cobalt-nickel-chrome-molybdenum-titanium, calcium phosphate-derivative coated metals, zirconia, zirconium-coated metals, titanium-coated metals, and other biocompatible metals. In an example, the material selected for each component of the TDI 301 is similar. Further, and according to an embodiment, the TDI 301 of the present disclosure can be manufactured via a variety of additive manufacturing or subtractive manufacturing techniques including but not limited to direct metal laser sintering, injection molding, iterative plate bending and computer-aided manufacturing.

In another embodiment, the bone plate 315 and the post 305 are manufactured separately, the bone plate 315 being fabricated according to the above-described techniques and the post 305 being manufactured according to techniques understood by one of ordinary skill in the art. In another embodiment, the bone plate 315 and the post 305 are manufactured together via three-dimensional metal printing. Following fabrication, the two components of the TDI 301 can be coupled at a junction consisting of the planar portion 317 of the bone plate 315 and the post apex 306 of the post 305. The coupling can be formed by a variety of approaches including but not limited to welding, frictional coupling, and structural adhesives. In the context of the present disclosure, screws are selected for the plurality of through apertures 318, or may be fabricated according to pre-determined specifications, in order to ensure rigid fixation of the bone plate 315 to the facial skeleton.

Further, and according to an embodiment, the TDI 301 of the present disclosure is manufactured according to physical dimensions of the selected skeletal features of each patient. As described above, the contoured portion 316 of the bone plate 315 is manufactured according to the selected skeletal region of each patient, the dimensions of the contoured portion 316 dependent, thereof. The number of through apertures 318, likewise, is dependent on the selected skeletal region and the minimum number of screws required in order to secure the bone plate 315 to the facial skeleton.

In an embodiment, the post 305 and the planar portion 317 of the bone plate 315 can be selected from a group of pre-determined sizes, their dimensions determined therein. In another embodiment, the post 316 and the planar portion 317 of the bone plate 315 may be custom manufactured according to the needs of the patient, the dimensions of the planar portion 317 of the bone plate 315 and post 316 being dependent, thereof. It should be appreciated that, using the above-described techniques and approaches, the present disclosure affords the flexibility to fabricate the TDI 301 with necessary dimensions based upon the needs of the individual patient.

According to an embodiment, a width of the bone plate 315 is equal to the diameter of the post 305. The thickness of the bone plate 315 is determined according to the length of the bone plate 315, wherein a longer bone plate 315 requires an increase in thickness of the bone plate 315 to support the post 305 and prevent excess micromotion. In an example, the thickness of the bone plate 315 ranges between 1.00 mm and 3.00 mm, and preferably between 1.25 mm and 2.00 mm. The length of the bone plate 315, therefore, is determined according to locally sufficient cortical bone.

According to an embodiment, the relative position of the post 305 and the contoured portion 316 of the bone plate 315 along a bone plate axis, defined as an axis including the longitudinal axis 311 of the bone plate 315, should be such that sufficient mechanical structure is provided to the TDI to withstand vertical loading. In an example, the anterior angle 313 between the post 305 and the contoured portion 316 of the bone plate 315 along the plate axis ranges between 90 degrees and 180 degrees, and preferably between 135 degrees and 180 degrees°.

According to an embodiment, and in accordance with United States Food and Drug Administration Class 2 Special Controls Guidance on Root-form Endosseous Dental Implants and Endosseous Dental Abutments, the diameter of the post 205 may be no smaller than 3.25 mm, the length of the post no smaller than 7.00 mm, and the abutment offset by no more than 30 degrees from a longitudinal axis of the post.

Figure 4A:
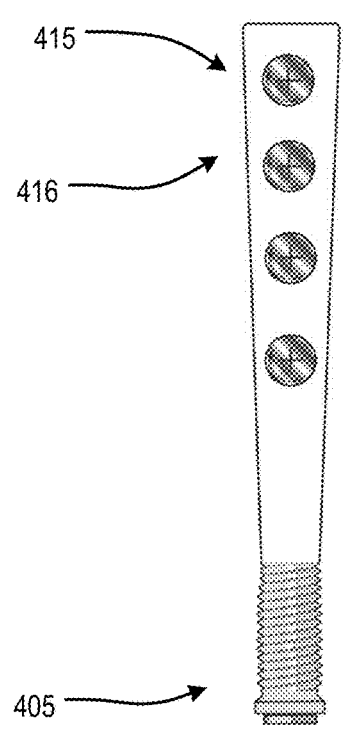
FIG. 4A is a schematic of an anterior view of a transalveolar dental implant, within the scope of the present disclosure.
Figure 4B:
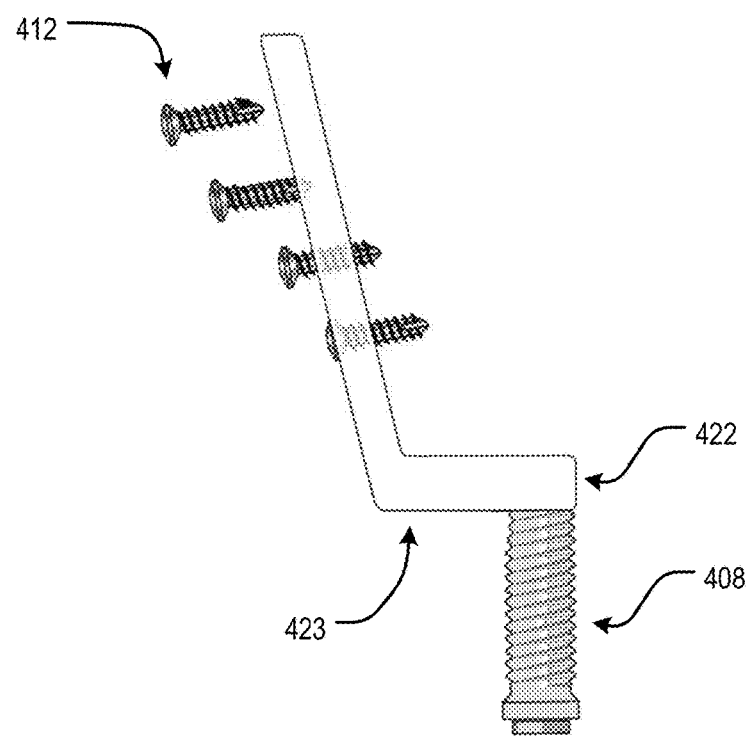
FIG. 4B is a schematic of a lateral view of a transalveolar dental implant, within the scope of the present disclosure.

FIG. 4A and FIG. 4B provide additional illustrations of the TDI. In an embodiment, the bone plate of the UM-TDI and/or the LM-TDI may have a structure similar to that of the bone plate of the TDI. As shown in FIG. 4A, an anterior view, the TDI may comprise a bone plate 415 having a contoured portion 416, specific to selected skeletal features, and a post 405. As shown in FIG. 4B, a lateral view, the TDI may further comprise a plurality of screws 412 configured according to a dimension of a corresponding plurality of through apertures.

In an embodiment, a thickness of the planar portion of the bone plate 422 may be between 1.00 mm and 2.00 mm and a length of the planar portion of the bone plate 423 may be between 3.00 mm and 5.00 mm. In an example, the thickness of the planar portion of the bone plate 422 may be 2.00 mm and a length of the planar portion of the bone plate 423 may be 4.00 mm.

In another embodiment, as alluded to above, a length of a post 408 may be between 7.00 mm and 12.00 mm. In an example, the length of the post 408 may be 8.00 mm. Moreover, the contoured portion 416 of the bone plate 415 may be angled with respect to the post 405.

Figures 5A, 5B, 5C:
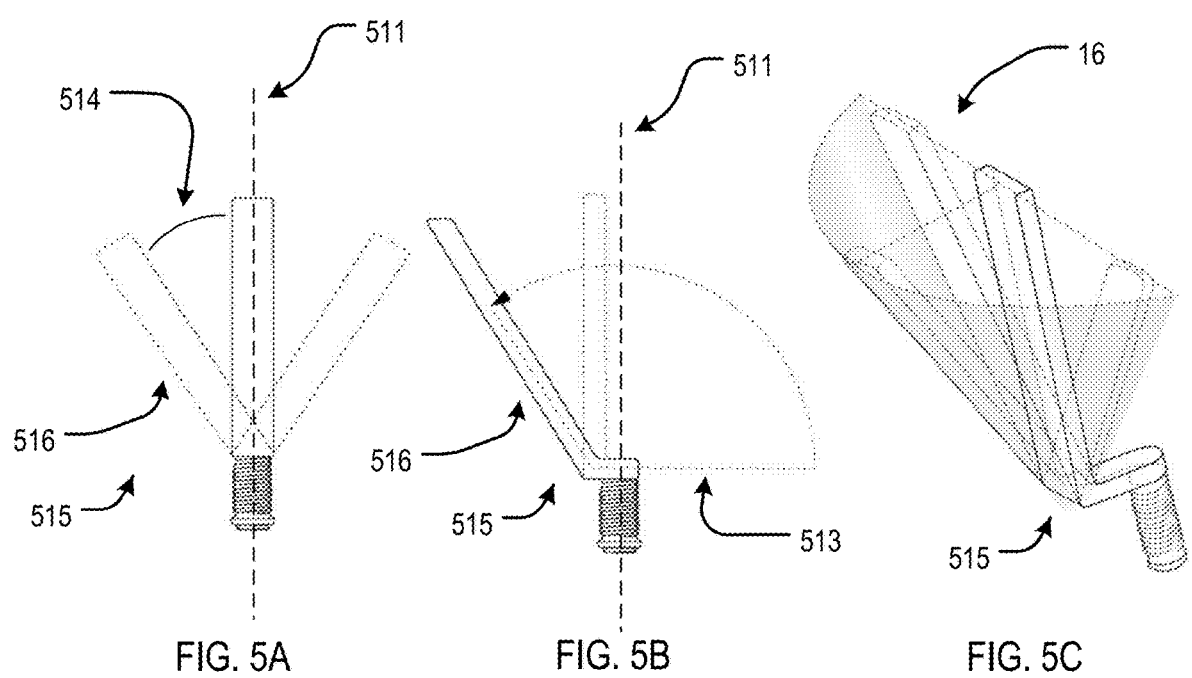
FIG. 5A is a schematic of an anterior view of a transalveolar dental implant, within the scope of the present disclosure.
FIG. 5B is a schematic of a lateral view of a transalveolar dental implant, within the scope of the present disclosure.
FIG. 5C is a perspective view of a transalveolar dental implant, within the scope of the present disclosure.

FIG. 5A, FIG. 5B, and FIG. 5C are illustrations of a variety of angular configurations of the contoured portion of the bone plate of the TDI. As above, it can be appreciated that the bone plate of the UM-TDI and/or the LM-TDI may have a similar structure and/or arrangement to that of the bone plate of the TDI.

In an embodiment, as shown in FIG. 5A, a lateral angle 514 of a contoured portion 516 of a bone plate 515 may be between −60° and +60° relative to a longitudinal axis 511 of the bone plate 515, in a first plane. In another embodiment, the lateral angle 514 of the contoured portion 516 of the bone plate 515 may be between −45° and +45°. In an example, the lateral angle 514 of the contoured portion 516 of the bone plate 515 may be +25°.

In another embodiment, as shown in FIG. 5B, an anterior angle 513 of the contoured portion 516 of the bone plate 515 may be between −60° and +60° relative to the longitudinal axis 511 of the bone plate 515, in a second plane.

In another embodiment, the anterior angle 513 of the contoured portion 516 of the bone plate 515 may be between −45° and +45°. In an example, the anterior angle 513 of the contoured portion 516 of the bone plate 515 may be +15°.

FIG. 5C is a schematic of a perspective view of the TDI of the present disclosure, wherein a range of positions of the contoured portion 516 of the bone plate 515 may be visualized. In an embodiment, a variety of anterior angles 513 and lateral angles 514 may be concurrently realized.

According to an embodiment, the above described ranges of anterior angles 513 and lateral angles 514 are determined such that the bone plate 515 may withstand normal loading forces during movement of the mouth including mastication, wherein anterior angles 513 and lateral angles 514 approximating 0° (or 180° in a different orientation) are ideal for load transfer.

Figure 6:
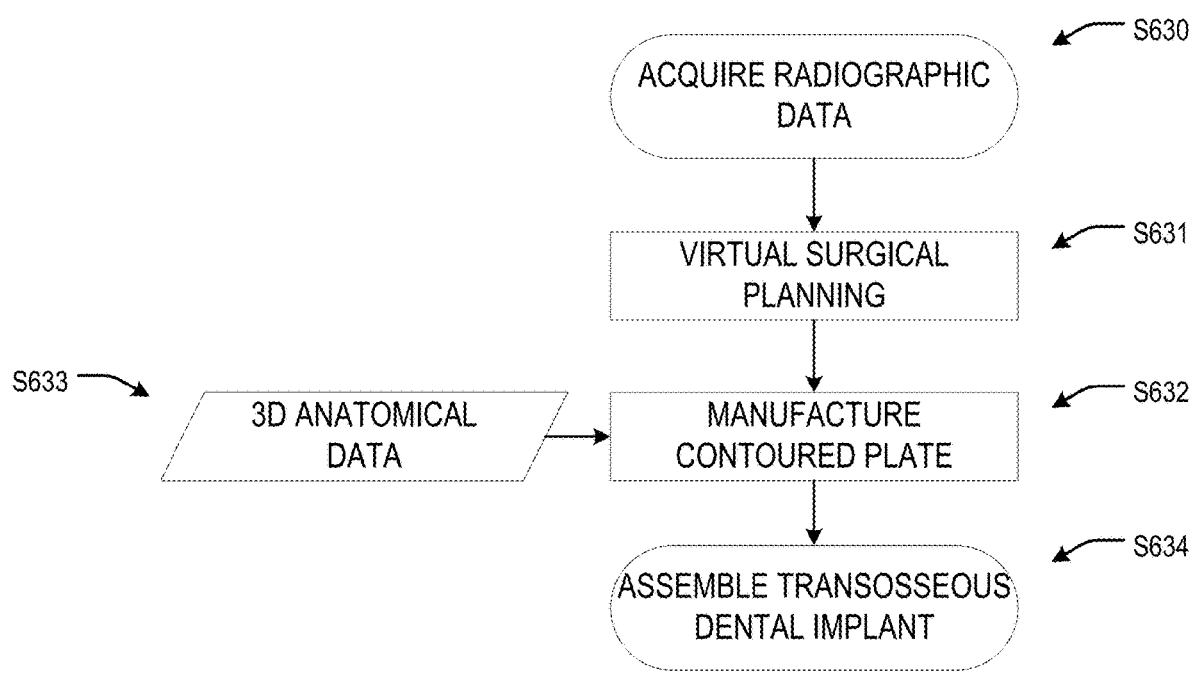
FIG. 6 is a flowchart of fabrication of a transalveolar dental implant, within the scope of the present disclosure.

Manufacture of the TDI, LM-TDI, or UM-TDI, according to an exemplary embodiment, is described in the flowchart of FIG. 6.

First, a cone beam computed tomography (CBCT or C-arm CT) of the facial skeleton (e.g., maxilla, mandible) is performed S630. The CBCT is aided by the use of radiopaque stents that provide a preview of a final restoration relative to adjacent structures, allowing for informed surgical planning. The radiopaque stent(s) also position the jaws into centric relation with proper vertical dimension of occlusion.

In some embodiments, a CBCT image of the bones of the facial skeletons proximate an upper molar for UM-TDI or a lower molar for LM-TDI may be acquired at the step S630. Radiopaque stents may also be used to provide an informed surgical planning for UM-TDI or LM-TDI.

Next, virtual surgical planning, performed via the data processing device, locates TDI, LM-TDI, or UM-TDI, positions S631 with alignment of a custom contoured bone plate along sufficiently thick cortical bones of the adjacent facial skeleton. According to an embodiment, the adjacent facial skeleton includes but is not limited to the nasomaxillary pillars and the zygomatic buttresses.

In some embodiments, the virtual surgical planning, performed via the data processing device, may include a selection of a surface of the bones of the facial skeleton based upon a determined thickness of the bones of the facial skeleton for the UM-TDI and LM-TDI in the step S630.

Following selection of the regions of interest, and after incorporating three-dimensional anatomical data into software S633, via the data processing device, the planar portion and contoured portion of the bone plate may be manufactured S632 according to the above-described methods. In an example, the bone plate is manufactured via additive titanium laser sintering to promote osseointegration.

In some embodiments, the data processing device may generate a contoured surface of the dental implant based on the selected dental implant fixation surface for the UM-TDI and LM-TDI.

During assembly S634, the post apex is welded to a surface of the planar portion of the bone plate such that a longitudinal axis of the post is perpendicular to the surface of the planar portion of the bone plate. The post, which extends from the post apex and protrudes through the mid crest of the alveolar bone, is manufactured according to the above-described methods in order to accept dental implant abutments.

For the UM-TDI and LM-TDI, a bone plate extending from a buccal end of a cylindrical plate of the dental implant may be fabricated. The cylindrical plate has support lattices extending therefrom, at least one support lattice of the support lattices being arranged on a lingual end of the cylindrical plate. The cylindrical plate has an opening in a central region thereof and the opening may be configured to receive the post.

Both the bone plate and associated screws provide locking technology to prevent loosening during loading. In addition to the TDI, UM-TDI, or LM-TDI, polyethylene templates, drill guides, and drill stop bushings can be manufactured via computer-aided design/computer-aided machining techniques to guide osteotomies. For example, the above-described polyethylene templates, drill guides, and drill stop bushings may be custom manufactured such that the angle, diameter, and depth of an osteotomy is controlled according to the skeletal structure of an individual patient. In an example, osteotomies are performed via side- and end-cutting surgical burs.

According to an embodiment, selection of the regions of interest during the manufacture of the TDI, LM-TDI, or UM-TDI, may be performed by the processing circuitry according to a skeletal parameter, for example, a minimal thickness of cortical bone. In another embodiment, selection of the regions of the interest during the manufacture of the TDI may be performed by a surgeon.

Figure 7A:
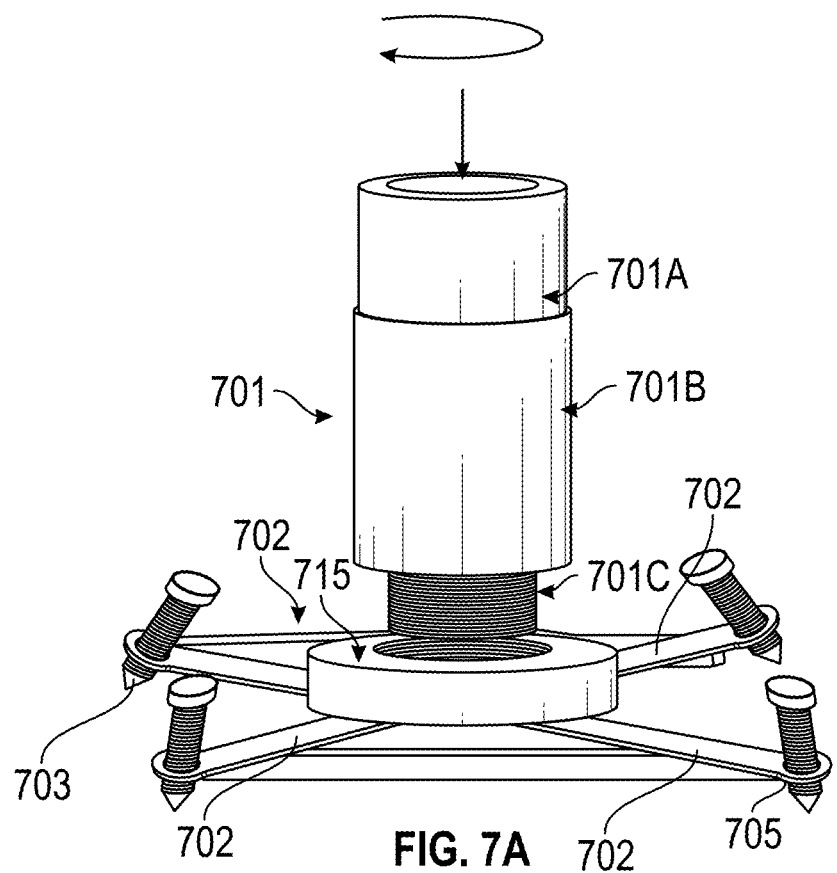
FIG. 7A provides a view of a dental post secured to the lower molar (LM) transalveolar dental implant plate, within the scope of the present disclosure.
Figure 7B:
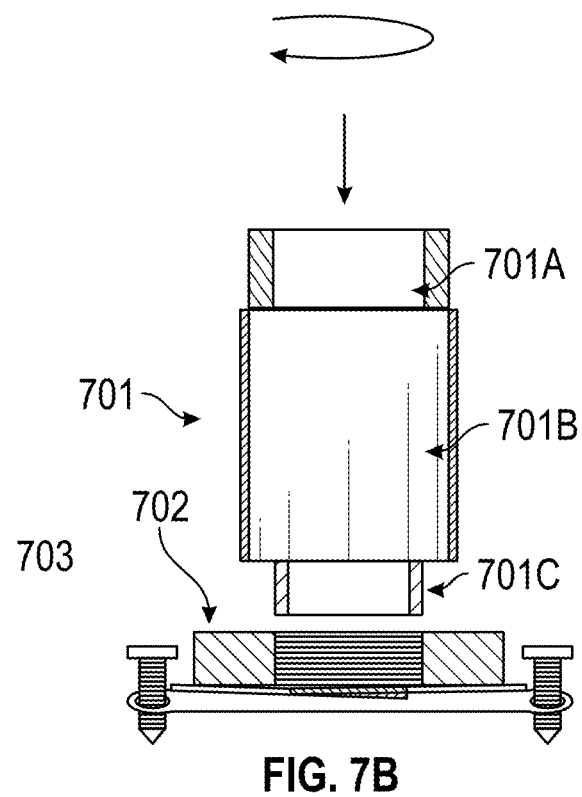
FIG. 7B provides a view of a dental post secured to the LM transalveolar dental implant plate, within the scope of the present disclosure.
Figure 7C:
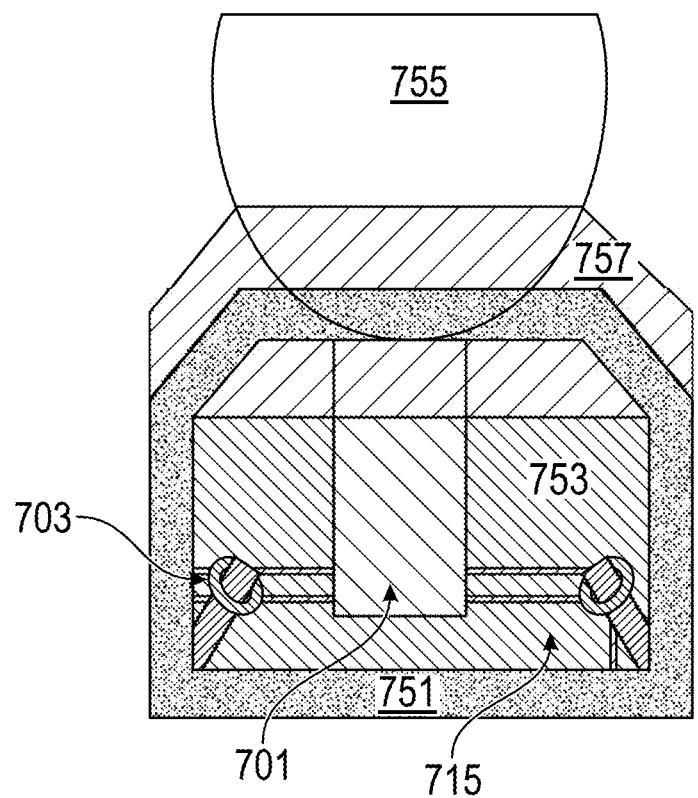
FIG. 7C is an exemplary 3D printed LM transalveolar dental implant, within the scope of the present disclosure.

With reference to FIG. 7A through FIG. 7C, an exemplary custom printed LM-TDI, for immediate restoration of anatomy and function after tooth extraction is illustrated, within the scope of the present disclosure.

In an embodiment, the UM-TDI structure and the LM-TDI structure may be similar. Therefore, FIG. 7A through FIG. 7C may illustrate that the LM-TDI includes the dental post 701, the cylindrical plate 715, locking mini screws 703, support lattices 702, and apertures 705 which are similar to those described earlier in FIG. 2B through FIG. 2D.

In an embodiment, the dental post 701 in FIG. 7A and FIG. 7B may be similar to the post 405 of the TDI in FIG. 4A and FIG. 4B.

In FIG. 7A, a perspective view of a dental post 701 secured to LM-TDI cylindrical plate 715 in situ with frictional coupling is shown. In FIG. 7B, a side view of the dental post 701 secured to LM-TDI cylindrical plate 715 in situ with frictional coupling is shown.

In an embodiment, the LM-TDI, the support lattices 702 on the LM-YDI may extend from buccal and lingual ends of the cylindrical plate 715 in FIG. 7A. In an example, the thickness of the bone plate of the lower molar (LM) ranges between 1.00 mm and 3.00 mm, and preferably between 1.25 mm and 2.00 mm. The length of the support lattices of the LM-TDI may be determined according to locally sufficient cortical bone.

In an embodiment, similar to the UM-TDI, the cylindrical plate 715 of the LM-TDI may also have an opening in a central region thereof. The opening of the cylindrical plate 715 may be configured to receive the dental post 701. The diameter of the cylindrical plate 715 may be between 5 mm and 8 mm, and preferably 6 mm. The diameter of the opening of the cylindrical plate 715 may be 3 mm and 6 mm, and preferably 4 mm.

In an embodiment, as briefly described earlier in FIG. 2A, the dental post 701 may include a post base 701A, a post body 701B, and a post apex 701C which will be described later in FIG. 7A. The dental post 701 may be configured to receive an abutment. The post body 701B may be the body portion of the dental post 701.

In an embodiment, the dental post 701 can be a non-metallic material such as zirconia, ceramic, fiber-reinforced resins, and carbon fiber, fiberglass, or a metallic material such as titanium, stainless steel, titanium alloy, and gold alloy. Other materials, as appropriate, may also be used.

In an embodiment, the diameter of the post base 701A of the dental post 701 may range between 3 mm and 6 mm. For example, the diameter of the post base 701A of the dental post 701 may be 4.5 mm. The height of the post base 701A may be between 2 mm and 3 mm.

In an embodiment, the diameter of the post body 701B of the dental post 701 may range between 4 mm and 7 mm. For example, the diameter of the post body 701B of the dental post 701 may be 5.5 mm. The height of the post body 701B may be between 6 mm and 10 mm.

In an embodiment, the diameter of the post apex 701C of the dental post 701 may range between 3.5 mm and 4 mm. For example, the diameter of the post apex 701C of the dental post 701 may be 4 mm. The height of the post apex 701C may be between 2 mm and 3 mm.

In an embodiment, the diameter of the post apex 701C of the dental post 701 may be the same as the opening of the cylindrical plate 715. For example, the diameter of the post apex 701C of the dental post 701 may be 4 mm and the opening of the cylindrical plate 715 may be 4 mm.

In an embodiment, locking mini screws 703 may be used to mount the LM-TDI to the buccal and lingual cortices of the patient. The locking mini screws 703 can be a non-metallic material such as zirconia, ceramic, fiber-reinforced resins, and carbon fiber, fiberglass, or a metallic material such as titanium, stainless steel, titanium alloy, and gold alloy. Other materials, as appropriate, may also be used.

In an embodiment, the number of the locking mini screws 703 may be, but not limited to, four, as illustrated in FIG. 7A. The length of the locking mini screws 703 may be between 4 mm and 8 mm. For example, the length of the locking mini screws 703 may be 5 mm. The diameter of the locking mini screws 703 may be between 1 mm and 2 mm.

In an embodiment, support lattices 702 may be coupled to the cylindrical plate 715. The support lattices 702 may extend from the buccal and lingual ends the cylindrical plate 715. The support lattices 702 may include apertures 705 for fixation. The support lattices 702 may be fixed to the facial skeleton by the locking mini screws 703 inserted into cortices of the facial skeleton through the apertures 705. In some embodiments, a bone graft alveolus may extend around the dental post 701, the cylindrical plate 211, and the support lattices 702.

In an embodiment, the support lattices 702 may have a length between 1 mm and 3 mm. The support lattices 702 may have a width between 1 mm and 2 mm. The number of the support lattices 702 used in the LM-TDI may be dependent on the number of the locking mini screws 703 and the number of the apertures 703. For example, four support lattices 702 are used to support four apertures 703, and four locking mini screws 703 are used to fix the dental post 701 through the four apertures 703.

In an embodiment, the support lattices 702 can be a non-metallic material such as zirconia, ceramic, fiber-reinforced resins, and carbon fiber, fiberglass, or a metallic material such as titanium, stainless steel, titanium alloy, and gold alloy. Other materials, as appropriate, may also be used.

In some embodiments, the support lattices 702 may not limited to a lattice structure. The supporting structures for the apertures can be, but not limited to, a circular structure, a grid structure, or the like.

In an embodiment, the apertures 703 may have a diameter between 1 mm and 2 mm. The diameter of the apertures 703 may also dependent on the diameter of the locking mini screws 703. For example, if the diameter of the locking mini screws 703 is 1.5 mm, then the diameter of the apertures 703 should be slight larger than 1.5 mm for the insertion of the locking mini screws 703 into the apertures 703.

In FIG. 7C, a detailed printed LM-TDI is illustrated. In FIG. 7D, a flow chart of a process of an analog crown over graft is illustrated.

In step S702, an internal alveolar osteotomy is guided by a template. For example, an area 751 in FIG. 7C is the internal alveolar osteotomy area that is guided by a template generated from a processing circuitry.

In step S704, a LM-TDI is secured to alveolar cortices. For example, the LM-TDI may be secured to the alveolar cortices by the mini locking screws 703 as illustrated in FIG. 7C. As mentioned earlier, the diameter of the mini locking screws 703 may be between 1 mm and 2 mm.

In step S706, the dental post 701 is secured to the LM-TDI cylindrical plate 715. For example, as described above, the post apex of the dental post 701 may be screwed into the opening of the cylindrical plate 715.

In step S708, bone graft alveolus 753 in FIG. 7C around the LM-TDI cylindrical plate 715 and the dental post 701 is performed.

In step S710, an analog crown 755 in FIG. 7C covers the bone graft. The analog crown 755 may be made of, but not limited to, acrylic. The size of the analog crown 755 may match the size and shape of the natural crown of a tooth being replaced.

In step S712, a gingivae 757 in FIG. 7C is supported by the analog crown 755.

Figure 8A:
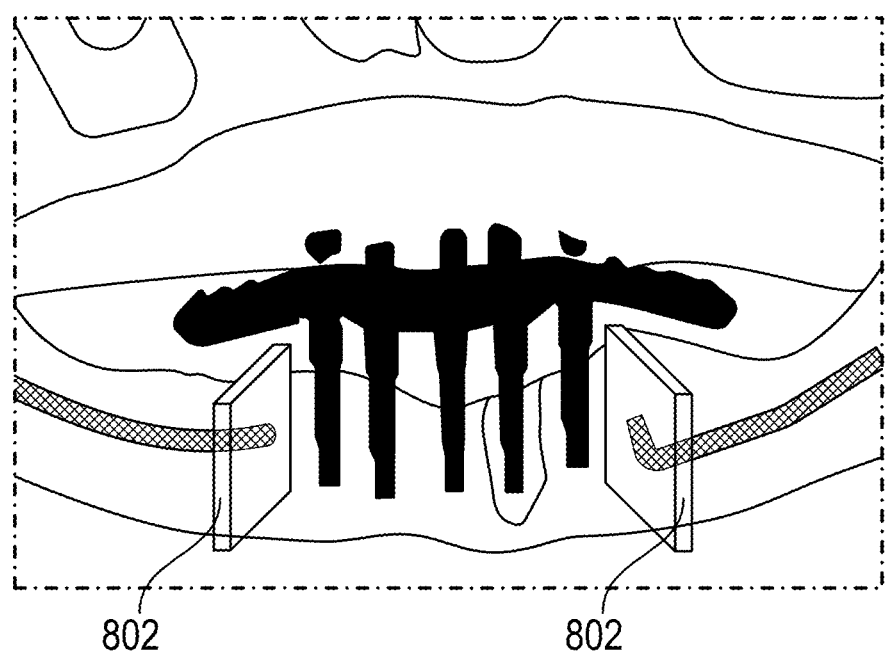
FIG. 8A is an exemplary failed conventional dental implants, within the scope of the present disclosure.
Figure 8B:
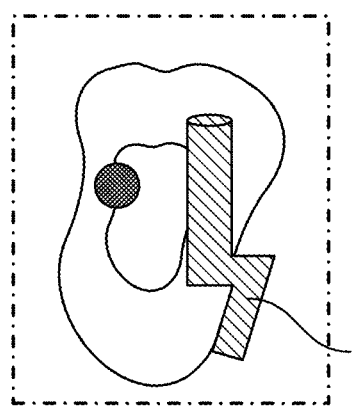
FIG. 8B is a cross sectional view of mandibular body posterior to mental foramina with sublingual transalveolar dental implant (SL-TDI), within the scope of the present disclosure.
Figure 8C:
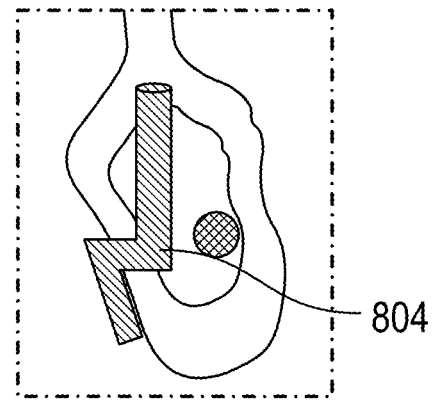
FIG. 8C is a cross sectional view of mandibular body posterior to mental foramina with SL-TDI, within the scope of the present disclosure.

In FIG. 8A, the outline of failed conventional dental implants located between the nerves of the mandible is illustrated on a standard panorex x-ray view. In an embodiment, the panorex x-ray view of the mandible shows nerves traveling through the mandibular body. The mandibular body ends at the point the nerves exit the mental foramens. In an embodiment, FIG. 8B and FIG. 8C provide illustrations of a cross sectional view of a mandibular body posterior to mental foramina with SL-TDI 804 through planes 802. The planes 802 are cross-sectional views within the mandibular body posterior to the mental foramens. The failed conventional dental implants are bunched together between the mental foramens to prevent injury to the nerve. The dental implant of the present disclosure may be arranged posterior to the mental foramens without injuring the nerves because the dental posts 701 may be arranged in precisely fabricated slots configured to receive the dental posts 701.

Figure 9A:
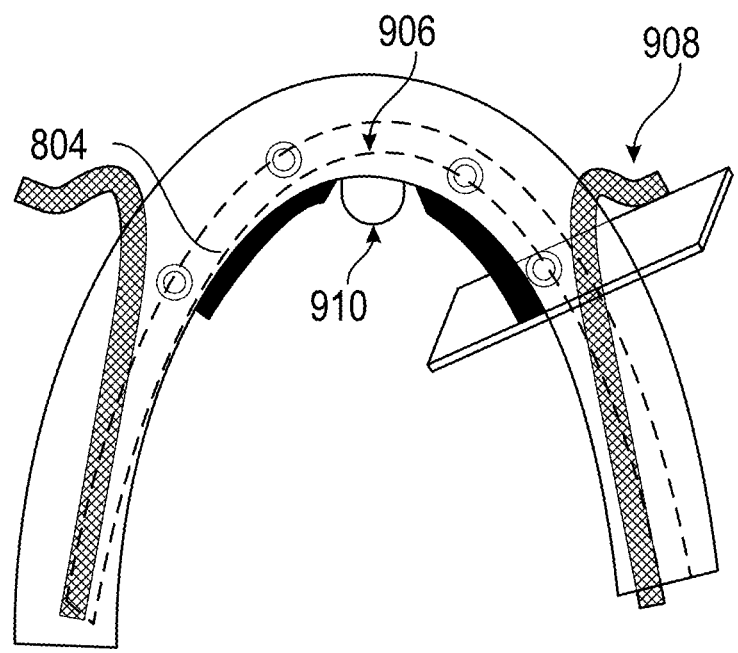
FIG. 9A is an exemplary bilateral SL-TDI for immediate full arch mandibular reconstruction, within the scope of the present disclosure.
Figure 9B:
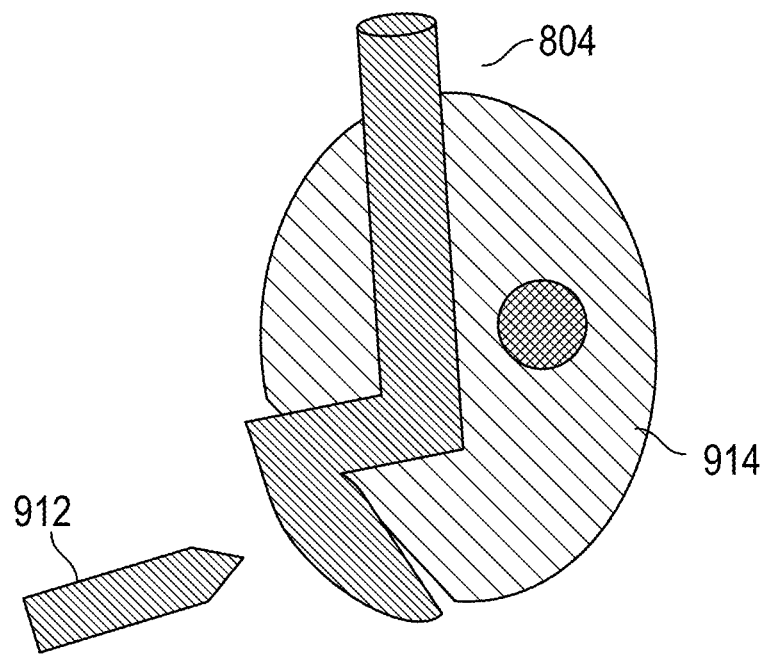
FIG. 9B is a cross section view of the exemplary bilateral SL-TDI, within the scope of the present disclosure.

With reference to FIG. 9A, an exemplary bilateral SL-TDI 804 for immediate full arch mandibular reconstruction may be shown within the scope of the present disclosure. FIG. 9B is a cross section view of the exemplary bilateral SL-TDI 804 device.

In FIG. 9A, 906 represents crest of ridge, 908 represents mental nerve, 910 represents genial tuberosity. In FIG. 9B, 912 represents mini screws engaging inferior border, and 914 represents nerve on buccal aspect of mandible just posterior to mental foramen.

In an embodiment, a complete dental arch reconstruction of a severely resorbed or deformed mandible uses two bilateral SL-TDI devices 804 designed with the plates secured with bone screws 912 into the sublingual cortex on either side of the genial tuberosity 910. Each SL-TDI plate 804 has two dental posts spaced 15 mm apart which are embedded in vertical osteotomies of the lingual cortex, with the possibility of the posterior dental posts placed in the mandibular body lingual to the mental nerve 908 since the mental nerve 908 passes near the buccal cortex before exiting the mental foramen. Fixation screws 912 engage the lingual cortex to secure the SL-TDI devices 804 after final alignment with an indexed full arch dental prosthesis. Bone graft is placed in the vertical osteotomy sites around the dental posts and covered with membrane before closure.

Figure 10:
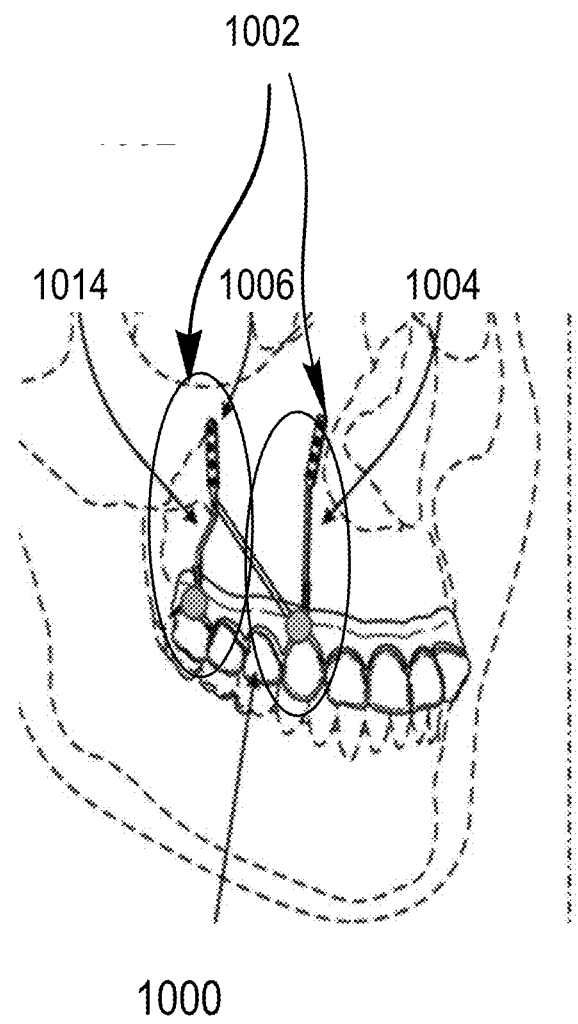
FIG. 10 is an illustration of one or more implanted transvestibular dental implants, within the scope of the present disclosure.

FIG. 10 illustrates a transvestibular implant (TVI) for intra-oral pin fixation of an unstable prosthesis or comminuted LeFort fracture, within the scope of the present disclosure.

In an embodiment, for each of the one or more implanted TVI 1002, a bone plate is secured to the facial skeleton via screws inserted into through apertures of the bone plate. A support rod 1004 is coupled to an end of the bone plate and extends through from the facial skeleton to a dental prosthesis 1000. From the described perspective, the relative dimensions and position of the bone plate on the facial skeleton, according to an embodiment, are observable. Further, the configuration of the support rod 1004 is observable, as well as an adjusted support rod 1014, angled in order to follow the contours of the facial skeleton.

In an embodiment, the TVI 1002 is a 1.5 mm to 2 mm diameter titanium pin with a bone plate feature on one end to attach to cortical bones of the zygoma and nasomaxilla. The titanium pin is bent with a 3-prong plier to conform to the facial bone contours to allow the other pin end to exit the vestibule to the level of an unstable prosthesis. Sturdy pin fixation is achieved with a pin from the zygoma plate to the prosthesis molar, bilaterally, a pin from the nasomaxilla plate to prosthesis canine, bilaterally, and a pin as a diagonal brace from zygoma plate to prosthesis canine, bilaterally. The 6 pins, e.g., 1006, are then luted to the prosthesis or fixated arch bars in the case of fractured maxilla. with adhesives. Essentially this is 4-point intraoral pin fixation to temporarily support an otherwise unstable prosthesis during healing or recovery from an infection. TVI pins, e.g., 1006, manufactured by titanium extrusion and stamping, are biased just below the plates to allow the pins, e.g., 1006, to be twisted and separated from the plates upon healing without invasive surgery to remove the entire device. TVI 1002 is an essential contingency device of TDI Technology. TVI 1002 may be useful in traumatology when internal fixation of maxillary fractures is not possible due to comminuted fractures or gunshot and shrapnel wounds.

Figure 11:
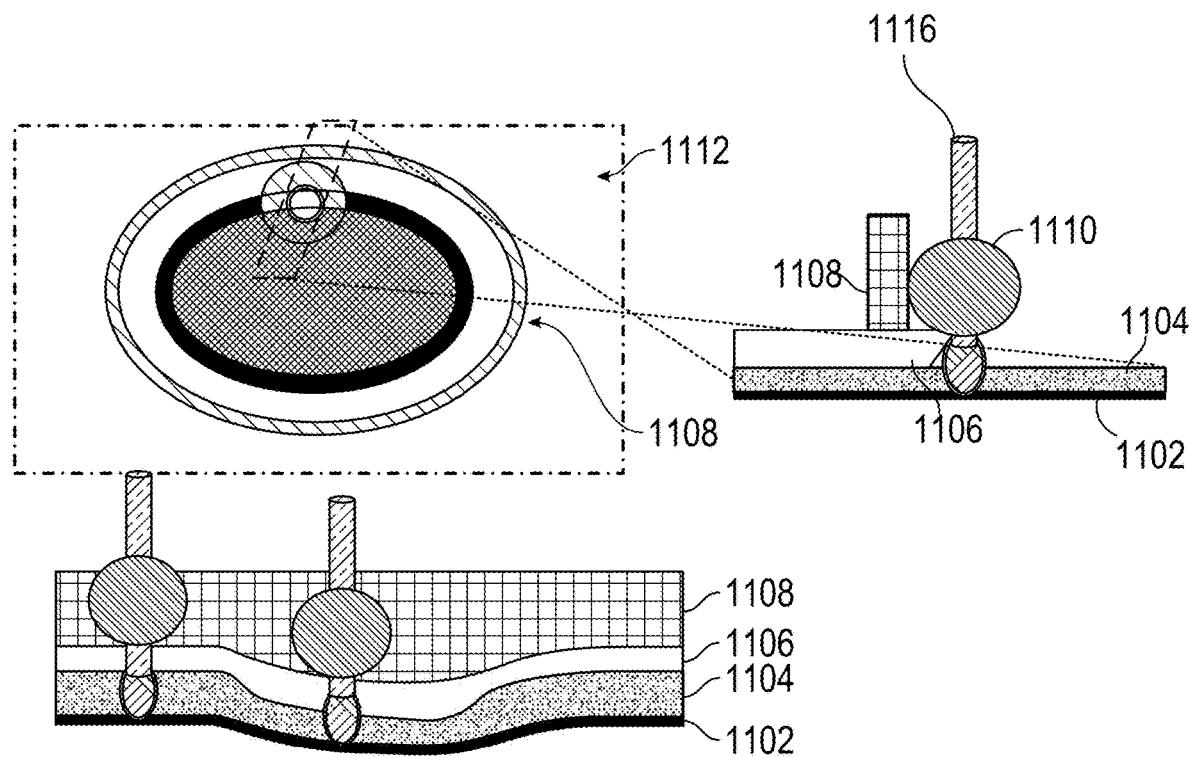
FIG. 11 is a lateral sinus wall with a template showing outline of osteotomy in three views, within the scope of the present disclosure.

With reference to FIG. 11, a lateral sinus wall with a template showing outline of osteotomy in three views may be shown, within the scope of the present disclosure. An osteotomy of the lateral sinus wall without cutting the underlying sinus membrane is an essential part of a sinus lift operation to provide particulate bone graft to augment the vertical dimension of the posterior maxillary alveolar ridge. An example of the sinus lift operation procedure is described in Abrahams, et al., *American Journal of Roentgenology.* 2000; 174: 1289-1292. 10.2214/ajr.174.5.1741289, which is incorporated herein by reference in its entirety for all purposes.

In an embodiment, in FIG. 11, 1102 represents sinus membrane, 1104 represents a sinus bony wall, 1106 represents the sinus lift template, and 1108 represents a raised feature on the sinus lift template. The edge of the sinus lift template 1106 has a beveled feature to accommodate the burr portion of 1116. The dashed box may represent a different view of the lateral sinus wall with a template such as a top view comparing with the other two views. The burr with depth limit bushing gliding against raised feature 1108 on sinus lift template 1106 to perform the osteotomy on the sinus bony wall 1104 without cutting sinus membrane 1102 may be illustrated in FIG. 11. The burr with depth limit bushing may be made of, but not limited to, titanium or stainless steel with the bushing also metal, acrylic or a composite material.

In an embodiment, the sinus membrane 1102 may be a Schneiderian membrane, which is a mucous membrane that covers the inner part of the maxillary sinus cavity.

In an embodiment, the sinus wall 1104 is bone. The thickness of the sinus wall 1104 bone is variable and may be between 0.5 mm and 2 mm.

In an embodiment, the sinus lift template 1106 may be made of, but not limited to, 3D printed polymer. The thickness of the master template 1106 may be between 1 mm and 3 mm depending on the corresponding underlying bony sinus wall 1104 thickness, such that the combined thickness of the sinus lift template 1106 and the sinus wall 1104 is a constant and equal to the burr 1116 length, which is limited and fixed by the depth-limit bushing 1110. Since the topography and thickness of the bony sinus wall 1104 is naturally variable, the CBCT scan will analyze the bone thickness and send messages to the CPU to 3D print the polymer master template 1106 in a corresponding manner in order for the thickness of the sinus wall 1104 and the sinus lift template 1106 to remain constant for a fixed length burr to cut through the sinus lift template 1106 overlayed on the bony sinus wall 1104, without cutting through the sinus membrane 1102.

In an embodiment, the raised feature 1108 may be made of, but not limited to, plastic. The raised feature 1108 is a 3D printed feature of the sinus lift template 1106 and it defines the outline of the bony sinus wall 1104 osteotomy. The height of the raised feature 1108 may be between 2 mm and 6 mm.

Figure 12A:
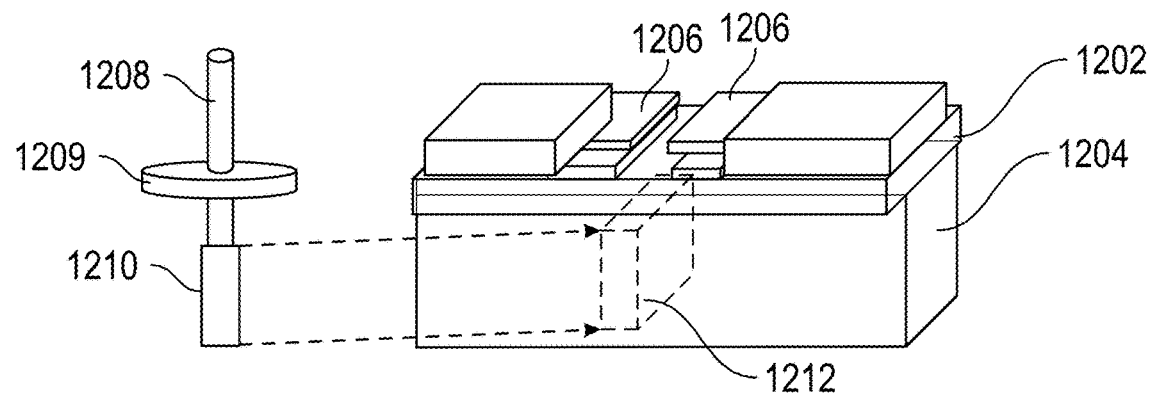
FIG. 12A provides a view of cutting channel guide mounted on master index template and burr with disk bushing to insert into channel for vertical osteotomies, within the scope of the present disclosure.
Figure 12B:
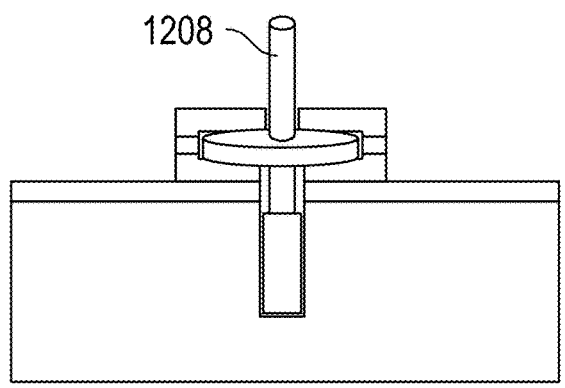
FIG. 12B provides a view of cutting channel guide mounted on master index template and burr with disk bushing to insert into channel for vertical osteotomies, within the scope of the present disclosure.
Figure 12C:
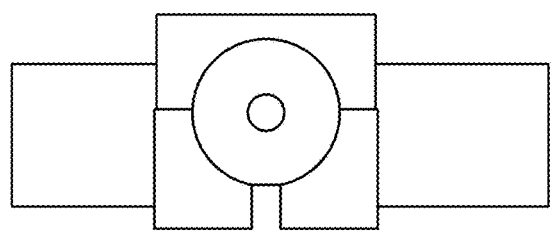
FIG. 12C provides a view of cutting channel guide mounted on master index template and burr with disk bushing to insert into channel for vertical osteotomies, within the scope of the present disclosure.

With reference to FIG. 12A through FIG. 12C, a schematic of a vertical osteotomy template 1206 mounted on a master index template 1202 (herein also referred to as "master template 1202") and burr shank 1208 and disk bushing 1209 to insert into the vertical osteotomy template 1206 for TDI vertical osteotomies may be shown, within the scope of the present disclosure. To that end, in an embodiment, a channel cutting template apparatus includes a first guide plate and a second guide plate comprising the vertical osteotomy template 1206 separated by a first gap (or a first channel), the first gap configured to receive the burr shank 1208 between the first guide plate and the second guide plate, the burr shank 1208 having a diameter narrower than a width of the first gap. The channel cutting template apparatus also includes a first top guide wall disposed on the first guide plate and a second top guide wall disposed on the second guide plate separated by a second gap, the first guide wall and the second guide wall being perpendicular to a plane of the first guide plate and the second guide plate, the second gap configured to receive the disk bushing 1209 (or any type of bushing or stopping feature) attached to the burr shank 1208 between the first guide wall and the second guide wall, the disk bushing 1209 having a diameter narrower than a width of the second gap, the first guide plate and the second guide plate configured to prevent the disk bushing 1209 from passing beyond a plane of the first guide plate and the second guide plate when the burr shank 1208 is inserted into the first gap and the disk bushing 1209 is inserted in the second gap. Notably, a thickness of the first guide plate and the second guide plate can be based on a thickness of the underlying sinus membrane.

In an embodiment, if sinus lift and bone grafting is planned in the posterior vertical osteotomy positions, the 3D printed polymer sinus wall template 1106 is snapped onto the master index template 1202 to perform the sinus wall osteotomy before the TDI vertical osteotomies may be performed.

In an embodiment, the master template 1106 outlines the osteotomy with a raised feature 1108 and controls the depth of the osteotomy by matching the thickness and topography of the template guide, e.g., 1106, to corresponding CT data of the underlying bone thickness and topography. The depth of the osteotomy may be between 0.5 mm and 3 mm.

In an embodiment, the uniform combined thickness of template guide, e.g., 1106, and bone allows a bone burr with a depth-limit bushing, e.g., 1110, to glide against the raised feature 1108 to create the osteotomy at the proper depth to prevent cutting the sinus mucosa lining. The proper depth may be between 1 mm and 3 mm.

In an embodiment, completion of TDI vertical osteotomies includes the completing the sinus wall osteotomy, removing the sinus wall template 1106, reflecting the sinus membrane 1102, and snapping the vertical osteotomy template 1206 onto the master index template 1202.

In an embodiment, the template 1106 may be closely adapted to the sinus wall 1104 as illustrated in the dashed box 1112. The template thickness may vary to corresponding CT data of sinus wall template 1106 to create a uniform combined thickness. The thickness of the template 1106 may be between 1 mm and 3 mm. The uniform combined thickness may be between 1.5 mm and 4 mm. A burr with depth limiter accurately cuts sinus wall 1104 to sinus membrane 1102 with a fixed length burr. The fixed length burr may have a length of approximately 3 mm.

In an embodiment, a resection template 1201 is placed after flaps are reflected and teeth removed. The resection template 1201 is a 3D printed polymer to straddle the maxillary alveolar bone 1204 at the level of the planned alveolectomy. The resection template 1201 is indexed to the nasopalatine foramina, or the nasal crest, and posterior alveolar crestal landmarks, bilaterally, and secured with bone screws to the maxillary arch with three projecting index tabs around the arch. The resection template 1201 guides the planned horizontal alveolectomy with a flat cutting shelf to serve as a platform for subsequent templates and as a retractor to reflect and protect soft tissue flaps.

After, the horizontal osteotomy master index template 1202 replaces resection template 1201 using same index holes used to align the resection template 1201.

In some embodiments, a 3D printed polymer vertical osteotomy template 1206 is snapped onto features of the master index template 1202. The vertical osteotomy template 1206 may have horizontal channels to guide burrs 1210 (e.g., shannon type) fitted with the disk bushings 1209 which slide into the horizontal channels to support accurate vertical osteotomies 1212 through the alveolar bone 1204. The vertical osteotomy template 1206 may be made of, but not limited to, polymer, plastic, or the like. The height of the vertical osteotomy template 1206 may be between 3 mm and 5 mm.

In an embodiment, the horizontal channels of the vertical osteotomy template 1206 and bushings, e.g., 1208 and 1209, may be made unique in terms of diameter and thickness to avoid wrong burrs from being used in the four different buccal osteotomy positions around the arch. The width of the horizontal channels of the vertical osteotomy template 1206 may be between 3 mm and 5 mm and the diameter of the bushings 1209 may be between 8 mm and 12 mm. The thickness of the channels may be between 2 mm and 4 mm and the thickness of the bushings 1209 may be between 2 mm and 4 mm.

In an embodiment, the TDI alignment/visual objective template 1203, with embedded metal copings on the undersurface to receive the TDI devices with the abutments screwed to dental posts, is manipulated back onto the master index template 1202 and seated as the abutments of each TDI device are secured to the copings with prosthetic screws. The TDI devices, now secured to a TDI alignment/visual objective template 1203 and positioned against the facial bone, are secured to the facial bone with locking screws. Locking screw technology may prevent bone screws from loosening from TDI devices and prevent tension between the TDI plates and bone from occurring when the screws are seated.

In an embodiment, the TDI alignment/visual objective template 1203 is unscrewed from TDI abutments and removed from master index template 1202. The master index template 1202 is unscrewed and removed from maxillary alveolar bone 1204. The wounds are irrigated. The vertical osteotomy sites are bone grafted around the embedded dental posts. The membranes are placed over grafts. The flaps are closed around protruding abutments attached to TDI dental posts. The temporary prosthesis 1207, with a properly contoured undersurface and accurately embedded copings to match those of the TDI alignment/visual objective template 1203, is placed over the abutments and secured with prosthetic screws.

Figures 1, 12D:
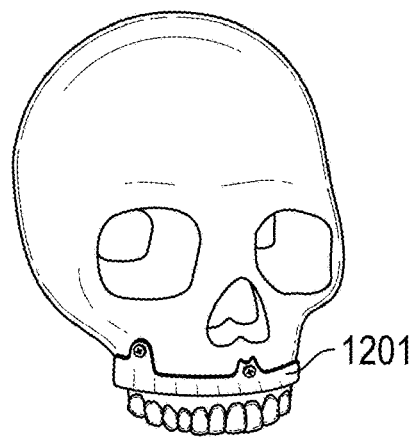
FIG. 12D-1 to FIG. 12M-1 show a sequence of stents used to precisely excise the alveolar bone using a resection template, within the scope of the present disclosure.
Figures 1, 12E:
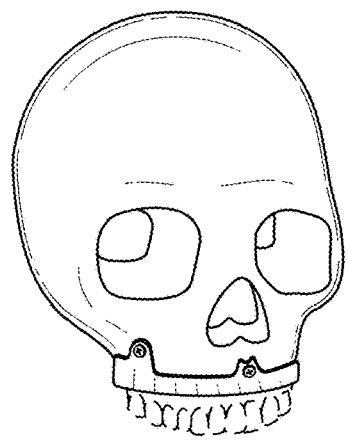
Figures 1, 12F:
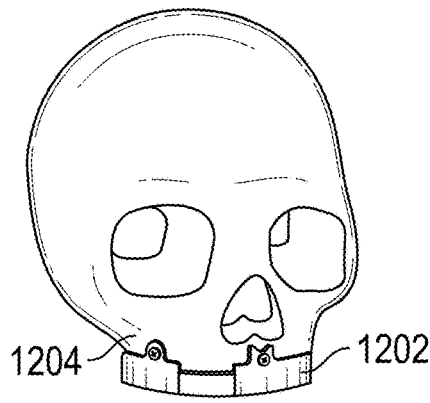
Figures 1, 12G:
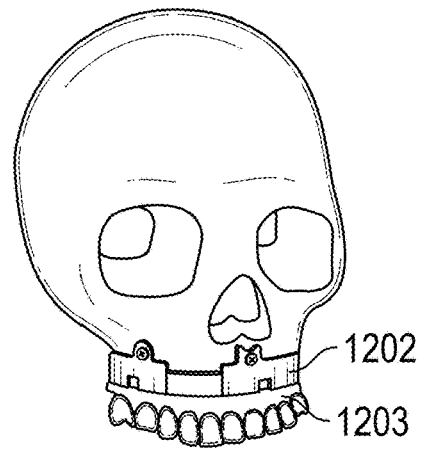
Figures 1, 12H:
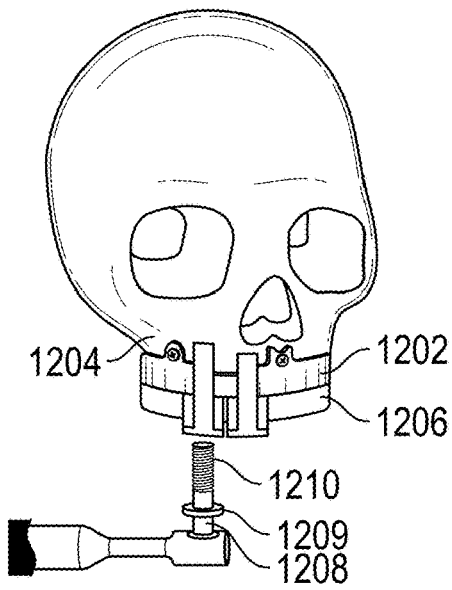
Figures 1, 12I:
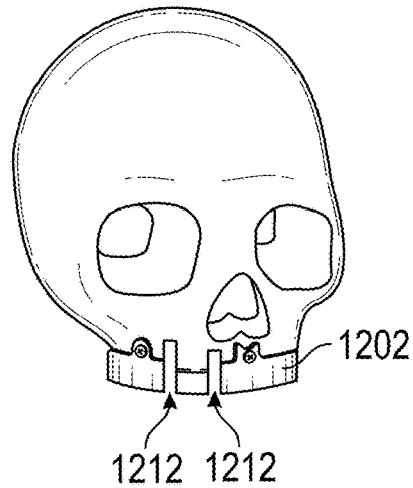
Figures 1, 12J:
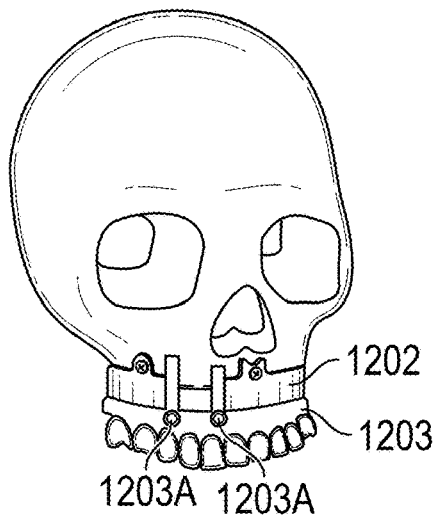
Figures 1, 12K:
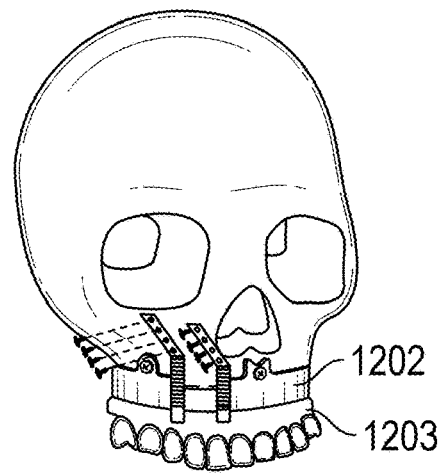
Figures 1, 12L:
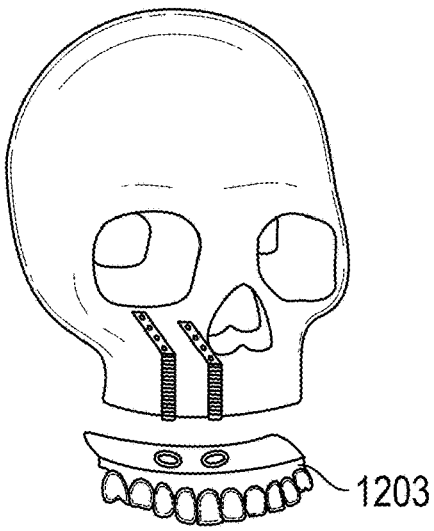
Figures 1, 12M:
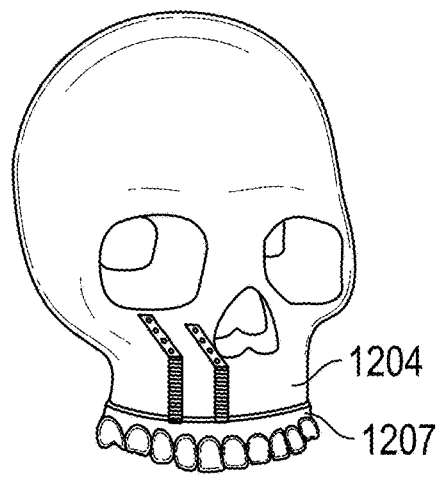

FIG. 12D-1 to FIG. 12M-1 show a sequence of stents used to precisely excise the alveolar bone 1204 using a resection template 1201 fixated at the corresponding horizontal level based on anatomic landmarks and using 3 screws engaging the resection template 1201 around the arch, within the scope of the present disclosure.

In particular, FIG. 12E-1 shows the dentition and appropriate alveolar bone excised. FIG. 12F-1 shows replacement of the resection template 1201 with the master index template 1202 fixated with 3 screws into index tabs of the master index template 1202 into screw holes used to fixate the resection template 1201. FIG. 12G-1 shows the TDI alignment/visual objective template 1203 snapped onto the master index template 1202 using 3 fasteners as shown in FIG. 12N-1. Once the TDI alignment/visual objective template 1203 position confirms the correct visual objective, the TDI alignment/visual objective template 1203 is snapped off of the master index template 1202. FIG. 12H-1 shows the alveolar bone 1204, the master index template 1202, and the vertical osteotomy template 1206. Notably, the burr can be introduced into the vertical slot osteotomy with the drilling. In FIG. 12I-1, the vertical osteotomy template 1206 is removed and the master index template and slots drilled into the skeleton remain. In FIG. 12J-1, the TDI alignment/visual objective template 1203 including copings 1203a is introduced.

Before the TDI alignment/visual objective template 1203 is snapped completely into the master index template 1202, the TDI devices can be placed into the vertical osteotomy sites and against the facial bone as shown in FIG. 12K-1. Manipulation of the TDI devices to couple with metal copings 1203A is then performed until abutment screws fixate the TDI alignment/visual objective template 1203 to the TDI devices, with the devices fully seated into the osteotomy sites and aligned to the facial skeleton. Locking bone screws then fixate the TDI devices to the facial bones.

In FIG. 12K-1, the TDI devices are attached to the TDI alignment/visual objective template 1203 and positioned into the slots. Notably, the plate should be positioned to the facial bone and the screws can go in at the same time, thus placing everything on and locking to the bone simultaneously.

FIG. 12L-1 shows removal of the master index template 1202 and the TDI alignment/visual objective template 1203. In this step, the wounds are irrigated, bone graft is placed in the vertical osteotomy sites, membranes placed, and the mucosa closed around the protruding TDI dental posts.

In FIG. 12M-1, the temporary prosthesis 1207 is coupled to the TDI devices using embedded metal copings in a similar manner done to couple the TDI alignment/visual objective template 1203 in the previous steps.

Figures 2, 12D:
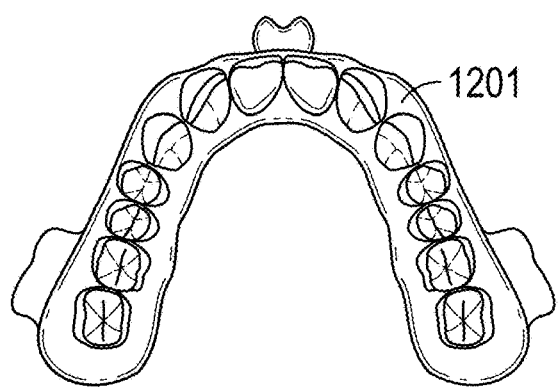
Figures 2, 12E:
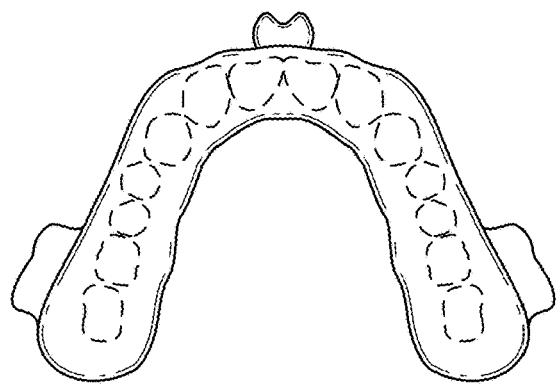
Figures 2, 12F:
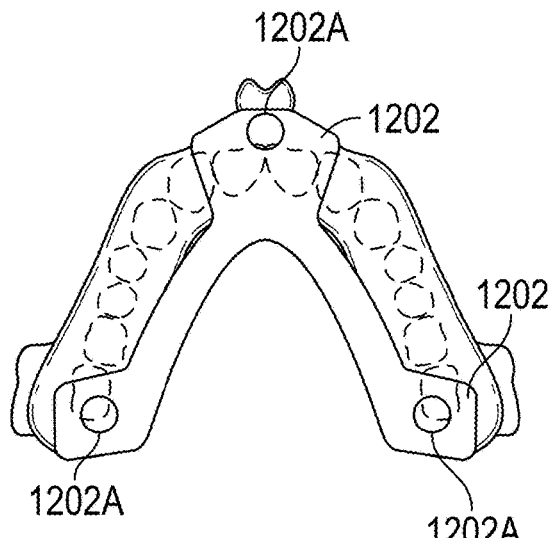
Figures 2, 12G:
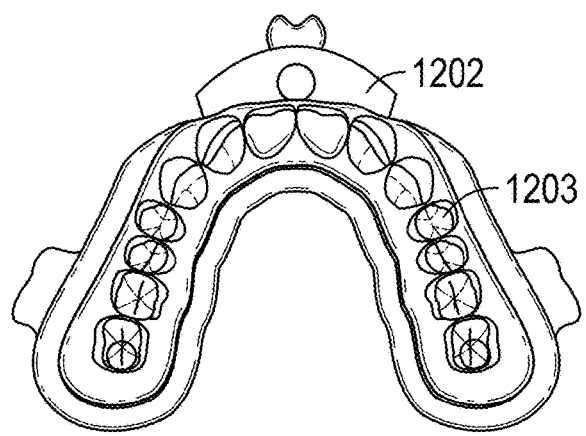
Figures 2, 12H:
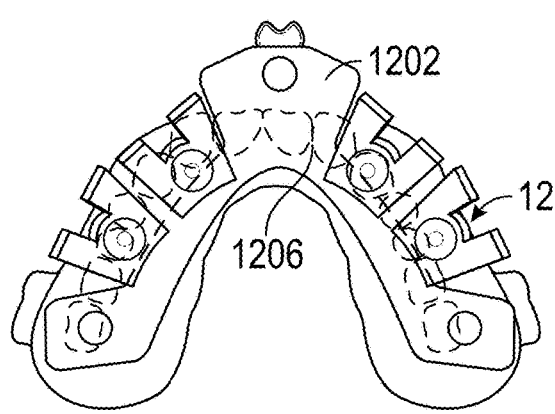
Figures 2, 12I:
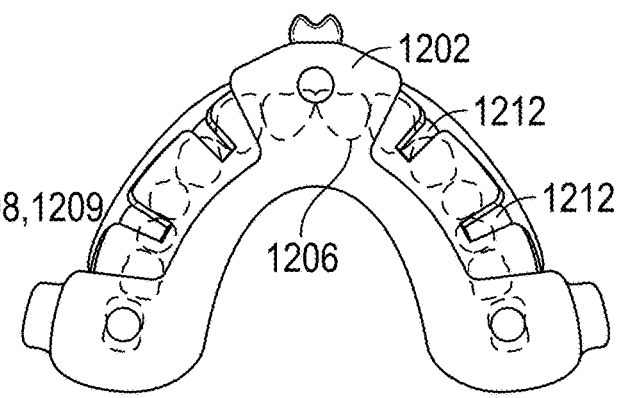
Figures 2, 12J:
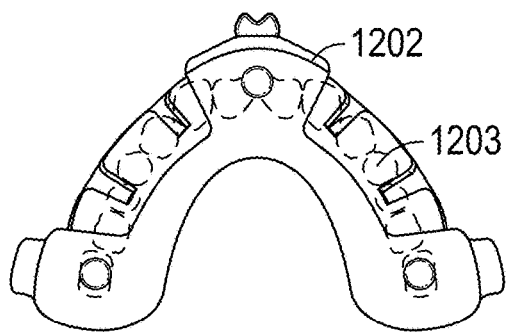
Figures 2, 12K:
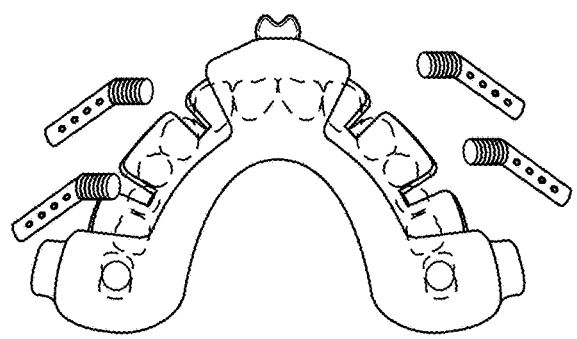

FIG. 12N-1 and FIG. 12N-2 show views of the fasteners used to interchange the templates, within the scope of the present disclosure. These can provide a snap-on feature with ease of removal (i.e., snap off).

FIG. 12N-1 shows the vertical osteotomy template 1206 snapped onto the master index template 1202 using identical fasteners. The burr with disk bushing (1208,1209,1210) are then introduced into the horizontal guides of the vertical osteotomy template 1206 to cut the vertical osteotomies 1212 in 4 areas around the arch as shown in FIG. 12I-1.

FIG. 12D-2 to FIG. 12M-2 is the occlusal view of the same templates and sequence of steps, within the scope of the present disclosure. FIG. 12D-2 to 12M-2 generally show the same sequence of steps as just described.

A similar approach is used on the mandibular arch, with the exception the vertical osteotomies are made in the lingual cortex, as shown in FIG. 8.

In an embodiment, a success to the present disclosure, e.g., TDI Technology, is an accurate surgery and a precise placement of the custom 3D printed TDI devices, abutments, and temporary prostheses. Custom 3D printed polymer templates support the surgeon to execute all bone cutting procedures, and the alignment of devices and prostheses.

In an embodiment, the process begins with virtual surgical planning (VSP) to design the final prosthetic objective with computer images of 3D CT scans, photos, and models, all merged to show the preoperative condition and the postoperative objective. The TDI devices are designed, 3D printed, and platforms milled to receive abutments. A 2 mm band of the dental post just below the platform is finished with a smooth surface to reduce oral bacteria contamination if the dental post is exposed due to crestal bone resorption. The rest of the embedded TDI device retains a rough surface to enhance osseointegration. Abutments are selected to connect the TDI devices to the temporary prosthesis. The temporary prosthesis is designed and either 3D printed or milled from a block of dental acrylic. Index templates are then designed, and 3D printed or molded to dental models with snap on cutting and alignment guides.

Figure 13:
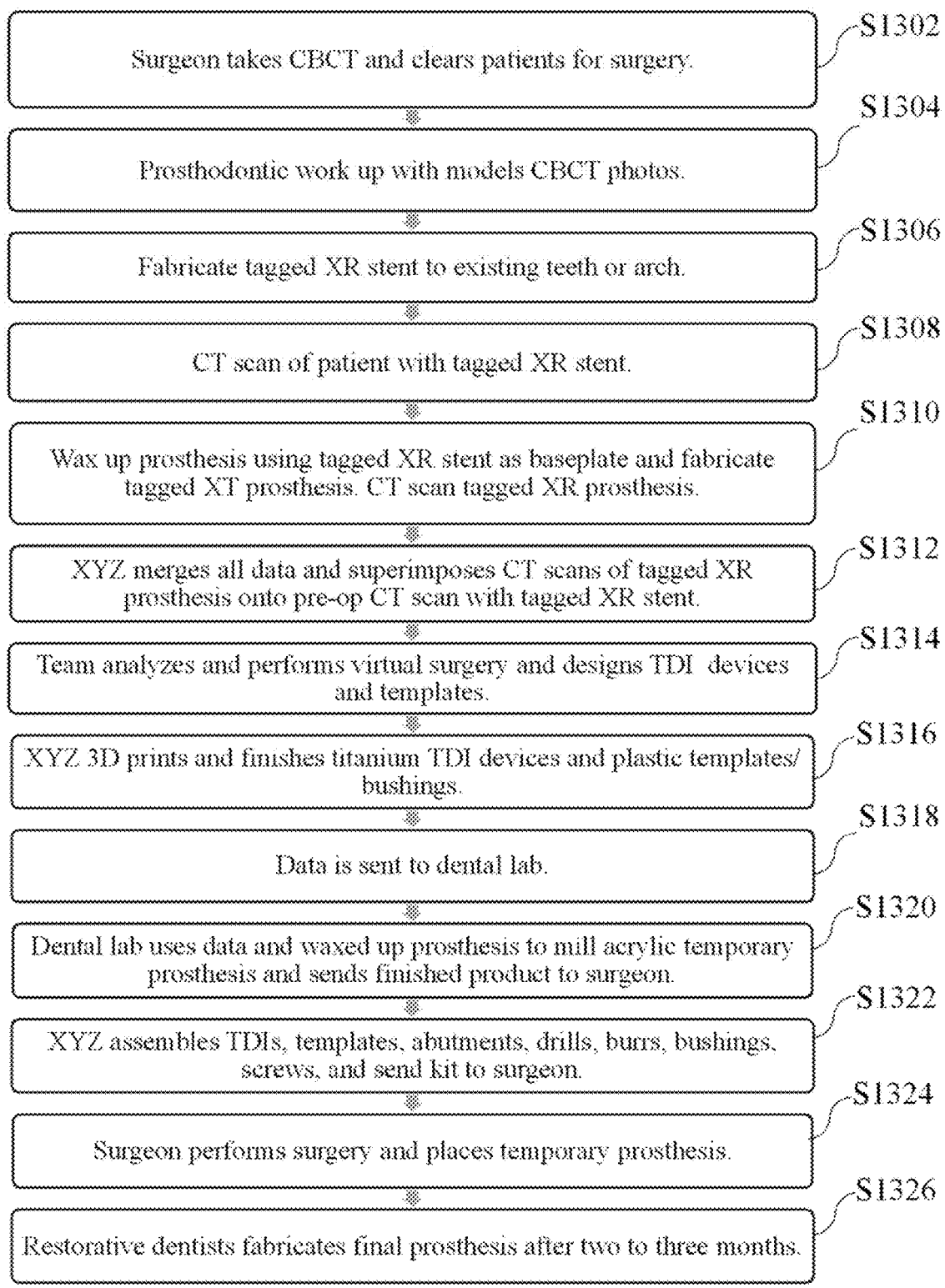
FIG. 13 is a flow diagram of a preoperative procedure, within the scope of the present disclosure.

FIG. 13 is a flow diagram of a preoperative procedure within the scope of the present disclosure.

In an embodiment, once the patient is cleared for the TDI surgical procedure in the step S1302, the restorative dentist performs the usual prosthetic work up with models, photos and x-rays in the step S1304. The restorative dentist fabricates a radiographic (XR) stent to fit over the existing teeth (or edentulous arch) and palate of maxilla with embedded metal markers to radiographically tag three areas around the palatal aspect of the arch in the step S1306. The XR stent may be fitted to the patient during the preoperative CT scan in the step S1308. The temporary prosthesis is then waxed up and duplicated in acrylic with radiographic barium sulfate acrylic paint to accurately outline the desired dental anatomy. This XR prosthesis uses XR stent with embedded metal markers as the baseplate. This XR prosthesis is then CT scanned as a separate structure in the step S1310.

In an embodiment, the CT scan images are then analyzed on an online shared workplace by the XYZ computer technician, surgeon and restorative dentist in the step S1312. The preoperative CT scan with XR stent allows the team to perform virtual surgery, import the XR prosthesis image and super-impose this XR prosthesis as the postoperative objective, with metal markers aligned and prosthesis correctly oriented to the underlying facial bones in the step S1314. In a manner similar to digitally planned orthognathic surgery, the XR prosthesis can be moved digitally to correct anterior-posterior, vertical, or midline discrepancies seen on overlaid CT images and photos.

In an embodiment, the team satisfied with the XR prosthesis position on the computer image, then digitally adds TDI dental post images into ideal position and builds the supporting TDI plates, using integrated design controls, and adds bone screw images into the facial bones to complete the virtual TDI devices. The technician then designs the master TDI index template, vertical osteotomy template and TDI alignment/visual objective template based on the XR prosthesis to support the surgeon in the execution of the procedures. Once digitally finalized, the technician exports the data to XYZ for manufacturing in the step S1316.

In an embodiment, data is also sent to a dental lab along with the waxed prosthesis (contoured to anticipate soft tissues around TDI implant platforms) for optical scanning to mill and finish the temporary prosthesis out of dental acrylic in the step S1318. The temporary prosthesis may have embedded titanium copings to match the planned abutment platforms in the step S1320.

In an embodiment, a similar prosthetic procedure is done for the mandible using the lingual bone plate as the stable area to orient the TDI dental posts and attached plates.

In an embodiment, all of these TDI preoperative procedures support the concept of a prosthetically-driven treatment plan: Prostheses are designed, radiographically tagged, oriented to the preoperative facial skeleton on a 3D CT scan, and then the TDI devices are designed to support the prosthesis in the step S1322. Templates support the surgeon to perform the surgical procedures within each dental arch and align the TDI's to the facial bones to eliminate the need to perform tedious, time-consuming free-hand surgical and prosthetic procedures, or pick-up transfers currently done with All-on-Four procedures in the step S1324.

In an embodiment, execution of the TDI reconstruction as described above will be precise and predictable. This is in contrast to current dental implant reconstruction using the All-on-Four approach which requires up to 4 hours per dental arch of chairside craftsmanship with unpredictable results which not only fatigues the patient but the treatment team in the step S1326.

Figure 14:
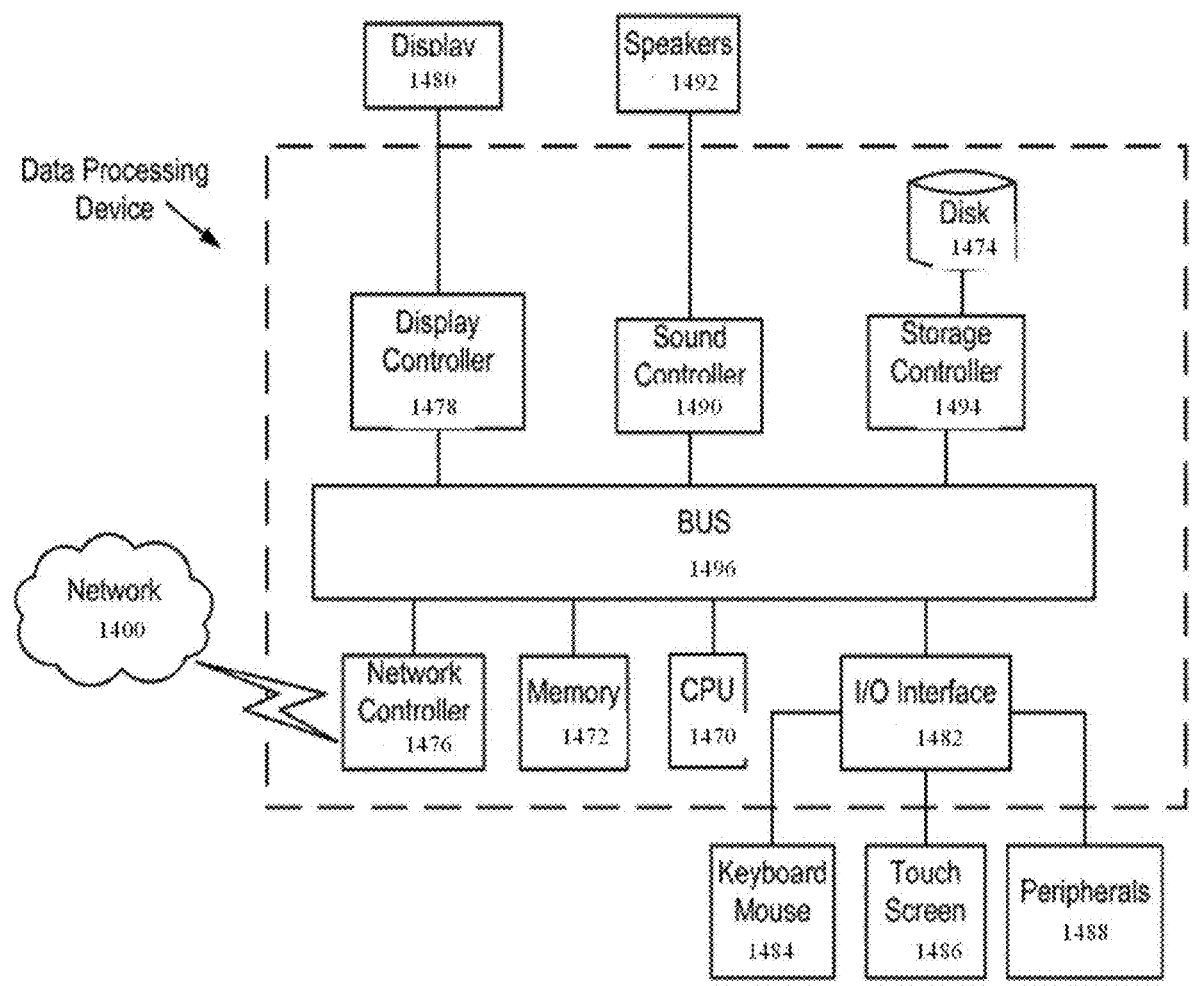
FIG. 14 is a hardware description of a data processing device, within the scope of the present disclosure.

In an embodiment, next, a hardware description of the data processing device according to exemplary embodiments is described with reference to FIG. 14. In FIG. 14, the data processing device includes a CPU 1470 which performs the processes described above and below. The process data and instructions may be stored in memory 1472. These processes and instructions may also be stored on a storage medium disk 1474 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the data processing device communicates, such as a server or computer.

In an embodiment, further, the claimed advancements may be provided as a utility application, background daemon, or component of an operating system, or combination thereof, executing in conjunction with CPU 1470 and an operating system such as Microsoft Windows 7, UNIX, Solaris, LINUX, Apple MAC-OS and other systems known to those skilled in the art.

In an embodiment, the hardware elements in order to achieve the data processing device may be realized by various circuitry elements, known to those skilled in the art. For example, CPU 1470 may be a Xenon or Core processor from Intel of America or an Opteron processor from AMD of America, or may be other processor types that would be recognized by one of ordinary skill in the art. Alternatively, the CPU 1470 may be implemented on an FPGA, ASIC, PLD or using discrete logic circuits, as one of ordinary skill in the art would recognize. Further, CPU 1470 may be implemented as multiple processors cooperatively working in parallel to perform the instructions of the inventive processes described above.

In an embodiment, the data processing device in FIG. 14 also includes a network controller 1476, such as an Intel Ethernet PRO network interface card from Intel Corporation of America, for interfacing with network 1400. As can be appreciated, the network 1400 can be a public network, such as the Internet, or a private network such as an LAN or WAN network, or any combination thereof and can also include PSTN or ISDN sub-networks. The network 1400 can also be wired, such as an Ethernet network, or can be wireless such as a cellular network including EDGE, 3G and 4G wireless cellular systems. The wireless network can also be WiFi, Bluetooth, or any other wireless form of communication that is known.

In an embodiment, the data processing device further includes a display controller 1478, such as a NVIDIA GeForce GTX or Quadro graphics adaptor from NVIDIA Corporation of America for interfacing with display 1480, such as a Hewlett Packard HPL2445w LCD monitor. A general purpose I/O interface 1482 interfaces with a keyboard and/or mouse 1484 as well as a touch screen panel 1486 on or separate from display 1480. General purpose I/O interface 1482 also connects to a variety of peripherals 1488 including printers and scanners, such as an OfficeJet or DeskJet from Hewlett Packard.

In an embodiment, a sound controller 1490 is also provided in the data processing device, such as Sound Blaster X-Fi Titanium from Creative, to interface with speakers 1492 or microphone thereby providing sounds and/or music.

In an embodiment, the general purpose storage controller 1494 connects the storage medium disk 1474 with communication bus 1496, which may be an ISA, EISA, VESA, PCI, or similar, for interconnecting all of the components of the data processing device. A description of the general features and functionality of the display 1480, keyboard and/or mouse 1484, as well as the display controller 1478, storage controller 1494, network controller 1476, sound controller 1490, and general purpose I/O interface 1482 is omitted herein for brevity as these features are known.

In an embodiment, this invention is for patients with tooth spaces of less than 6 mm mesial-distal. This condition is commonly found in maxillary lateral incisor and mandibular incisor positions. Conventional dental implants have as their narrowest implant 2.9 mm diameter round posts. It is generally accepted the minimal distance between the side of an implant and adjacent tooth is 1.75 mm, and this requires a 6.4 mm dentoalveolar space between the roots at the alveolar crest to accommodate a 2.9 mm implant. Convergent adjacent roots are another limiting condition for conventional dental implants.

The present disclosure solves the conventional dental implant limitation with the narrow device, e.g., N-TDI. The N-TDI has a 3D printed titanium dental post with an oval cross-section of less than 2 mm mesial-distal and 3 mm or more buccal-lingual dimension for strength. Since the N-TDI dental post is not screwed into the alveolus, instead, the N-TDI dental post may be placed in a vertical osteotomy. In addition, the N-TDI's attached plate and screws secure the N-TDI device for stability.

Rescue Transalveolar Dental Implant.

In some embodiments, the present invention, e.g., TDI Technologies, is the rescue dental implant device, e.g., R-TDI, which may replace failed conventional dental implants supporting an expensive full arch prosthesis. Essentially, after the prosthesis is unscrewed, failed conventional implants removed, alveolus debrided, custom 3D printed titanium R-TDIs are attached to the dental prosthesis as a retrofit and secured to adjacent cortical bones with the attached plate after the prosthesis is screwed to the remaining conventional implants. The alveolar defects are then bone grafted around the one-piece embedded R-TDI devices.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method of manufacture of a dental implant for a molar, comprising acquiring, by processing circuitry, structural data corresponding to one or more bones of the facial skeleton, the one or more bones of the facial skeleton being proximate the molar, selecting, by the processing circuitry and as a dental implant fixation surface, a surface of the one or more bones of the facial skeleton based upon a determined thickness of the one or more bones of the facial skeleton, generating, by the processing circuitry and based on the selected dental implant fixation surface, a contoured surface of the dental implant, and fabricating, based upon an instruction transmitted by the processing circuitry, a bone plate extending from a buccal end of a cylindrical plate of the dental implant, the cylindrical plate having support lattices extending therefrom, at least one support lattice of the support lattices being arranged on a lingual end of the cylindrical plate, the cylindrical plate having an opening in a central region thereof, the opening being configured to receive a dental post.

(2) The method of manufacture according to (1), wherein the bone plate is fabricated via direct metal laser sintering.

(3) The method of manufacture according to either (1) or (2), wherein the structural data includes the determined thickness of the one or more bones of the facial skeletons.

(4) The method of manufacture according to any one of (1) to (3), wherein the molar includes upper molar and lower molar.

(5) The method of manufacture according to any one of (1) to (4), wherein the instruction is generated by the processing circuitry based upon the selection of the dental implant fixation surface and the generation of the contoured surface.

(6) The method of manufacture according to any one of (1) to (5), wherein the dental post is connected to the molar.

(7) The method of manufacture according to any one of (1) to (6), wherein the support lattices includes an aperture for fixation.

(8) The method of manufacture according to any one of (1) to (7), wherein the support lattices are fixed to the facial skeleton by a screw inserted into alveolar cortices of the facial skeleton through the aperture.

(9) The method of manufacture according to any one of (1) to (8), wherein the dental implant is titanium.

(10) The method of manufacture according to any one of (1) to (9), wherein the dental post is frictionally-coupled to the opening of the cylindrical plate.

(11) A dental implant for a molar, comprising a dental post, a cylindrical plate having an opening in a central region thereof, the opening being configured to receive the dental post, a bone plate extending from a buccal end of the cylindrical plate, the bone plate having a surface for contact with one or more bones of the facial skeleton, the surface being contoured relative to a surface of the one or more bones of the facial skeleton and based on a thickness of the one or more bones of the facial skeleton, and support lattices coupled to the cylindrical plate, the support lattices extending from a lingual end the cylindrical plate, the support lattices including an aperture for fixation.

(12) The dental implant of (11), wherein the dental post is frictionally-coupled to the opening of the cylindrical plate.

(13) The dental implant of either (11) or (12), wherein the dental implant is titanium.

(14) The dental implant of any one of (11) to (13), wherein the support lattices are fixed to the facial skeleton by a screw inserted into alveolar cortices of the facial skeleton through the aperture.

(15) The dental implant of any one of (11) to (14), wherein a bone graft alveolus extends around the dental post, the cylindrical plate, and the support lattices.

(16) The dental implant of any one of (11) to (15), wherein the bone plate is fabricated via direct metal laser sintering.

(17) The dental implant of any one of (11) to (16), wherein the molar includes upper molar and lower molar.

(18) The dental implant of any one of (11) to (17), wherein a structure data corresponding to one or more bones of the facial skeleton including the thickness of the one or more bones of the facial skeleton is acquired by a processing circuitry.

(19) The dental implant of any one of (11) to (18), wherein the processing circuitry further provides an instruction to fabricate the bone plate.

(20) A transalveolar dental implant (TDI) alignment/visual analog template apparatus, comprising: embedded copings to receive and align TDI devices into vertical osteotomies formed by a channel/cutting template apparatus, the TDI aligned by the TDI alignment/visual analog template apparatus being stabilized to facial skeleton, a prefabricated temporary prosthesis with the embedded copings located as in the TDI alignment/visual analog template being coupled to the TDI devices without any further adjustments or chairside customization.

(21) A channel cutting template apparatus, comprising: a first guide plate and a second guide plate separated by a first gap, the first gap configured to receive a burr shank between the first guide plate and the second guide plate, the burr shank having a diameter narrower than a width of the first gap; and a first top guide wall disposed on the first guide plate and a second top guide wall disposed on the second guide plate separated by a second gap, the first guide wall and the second guide wall being perpendicular to a plane of the first guide plate and the second guide plate, the second gap configured to receive a bushing attached to the burr shank between the first guide wall and the second guide wall, the bushing having a diameter narrower than a width of the second gap, the first guide plate and the second guide plate configured to prevent the bushing from passing beyond a plane of the first guide plate and the second guide plate when the burr shank is inserted into the first gap and the bushing is inserted in the second gap.

By providing the features of the disclosure, it is possible to print thermoplastic layers or films using the optical mold which is controlled by the temperature control unit. This is different with the prior systems since the temperature of the prior systems cannot be controlled so the quality of thermoplastic layers or films is lower.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of manufacture of a dental implant for a molar, comprising:

acquiring, by processing circuitry, structural data corresponding to one or more bones of the facial skeleton, the one or more bones of the facial skeleton being proximate the molar;

selecting, by the processing circuitry and as a dental implant fixation surface, a surface of the one or more bones of the facial skeleton based upon a determined thickness of the one or more bones of the facial skeleton;

generating, by the processing circuitry and based on the selected dental implant fixation surface, a contoured surface of the dental implant; and fabricating, based upon an instruction transmitted by the processing circuitry, a bone plate extending from a buccal end of a cylindrical plate of the dental implant, the cylindrical plate having support lattices extending therefrom, at least one support lattice of the support lattices being arranged on a lingual end of the cylindrical plate, the cylindrical plate having an opening in a central region thereof, the opening being configured to receive a dental post.

2. The method of manufacture according to claim 1, wherein the bone plate is fabricated via direct metal laser sintering.

3. The method of manufacture according to claim 1, wherein the structural data includes the determined thickness of the one or more bones of the facial skeletons.

4. The method of manufacture according to claim 1, wherein the molar includes upper molar and lower molar.

5. The method of manufacture according to claim 1, wherein the instruction is generated by the processing circuitry based upon the selection of the dental implant fixation surface and the generation of the contoured surface.

6. The method of manufacture according to claim 1, wherein the dental post is connected to the molar.

7. The method of manufacture according to claim 1, wherein the support lattices include an aperture for fixation.

8. The method of manufacture according to claim 7, wherein the support lattices are fixed to the facial skeleton by a screw inserted into alveolar cortices of the facial skeleton through the aperture.

9. The method of manufacture according to claim 1, wherein the dental implant is titanium.

10. The method of manufacture according to claim 1, wherein the dental post is frictionally-coupled to the opening of the cylindrical plate.

11. The method of manufacture according to claim 1, wherein the cylindrical plate includes a support arm extending from the cylindrical plate, the support arm having a shape matching the surface of the one or more bones of the facial skeleton proximate an upper molar, the support arm includes an aperture for fixation.

12. The method of manufacture according to claim 11, further comprising fixing the support arm to the facial skeleton proximate the upper molar by a screw inserted through the aperture of the support arm.

13. The method of manufacture according to claim 1, further comprising fabricating an alignment template including an embedded coping configured to receive and align the dental implant using the alignment template, the dental implant aligned by the alignment template being stabilized to the facial skeleton, a prefabricated temporary prosthesis with the embedded coping located in the alignment template being coupled to the dental implant without any further adjustments or chairside customization.

* * * * *